(12) United States Patent
Wankat

(10) Patent No.: US 6,740,243 B2
(45) Date of Patent: May 25, 2004

(54) SYSTEMS AND PROCESSES FOR PERFORMING SEPARATIONS USING A SIMULATED MOVING BED APPARATUS

(75) Inventor: Phillip C. Wankat, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 42 days.

(21) Appl. No.: 10/003,043

(22) Filed: Nov. 15, 2001

(65) Prior Publication Data

US 2003/0010716 A1 Jan. 16, 2003

Related U.S. Application Data

(60) Provisional application No. 60/249,063, filed on Nov. 15, 2000.

(51) Int. Cl.$^7$ .............................................. B01D 15/08
(52) U.S. Cl. ...................................... 210/656; 210/659
(58) Field of Search ................................. 210/635, 656, 210/659, 662, 198.2; 127/46.1, 46.2

(56) References Cited

U.S. PATENT DOCUMENTS

| | | | |
|---|---|---|---|
| 2,985,589 A | 5/1961 | Broughton et al. | 210/34 |
| 3,831,755 A | 8/1974 | Goodman et al. | 210/108 |
| 4,001,113 A | 1/1977 | Schoenrock et al. | 210/189 |
| 4,182,633 A | 1/1980 | Ishikawa et al. | 127/46.1 |
| 4,247,636 A | 1/1981 | Schoenrock et al. | 435/94 |
| 4,400,278 A | 8/1983 | Martinola | 210/678 |
| 4,404,037 A | 9/1983 | Broughton | 210/674 |
| 4,412,866 A | 11/1983 | Schoenrock et al. | 210/656 |
| 4,434,051 A | 2/1984 | Golem | 210/264 |
| 4,501,814 A | 2/1985 | Schoenrock et al. | 435/94 |
| 4,511,476 A | 4/1985 | Schoenrock | 210/678 |
| 4,990,259 A | 2/1991 | Kearney et al. | 210/659 |
| 5,102,553 A | 4/1992 | Kearney et al. | 210/659 |
| 5,156,736 A | 10/1992 | Schoenrock | 210/264 |
| 5,198,120 A | 3/1993 | Masuda et al. | 210/659 |
| 5,223,143 A | 6/1993 | Masuda et al. | 210/659 |
| 5,391,299 A | 2/1995 | Masuda et al. | 210/659 |
| 5,401,476 A | 3/1995 | Hotier et al. | 422/222 |
| 5,456,825 A | 10/1995 | Negawa et al. | 210/98 |
| 5,595,665 A | 1/1997 | Noe | 210/662 |
| 5,719,302 A | 2/1998 | Perrut et al. | 554/191 |
| 5,882,523 A | 3/1999 | Hotier et al. | 210/659 |
| 6,004,518 A | 12/1999 | Green | 422/190 |
| 6,015,491 A | 1/2000 | Renard et al. | 210/198.2 |
| 6,017,448 A | 1/2000 | Hotier et al. | 210/198.2 |
| 6,063,285 A | 5/2000 | Hotier et al. | 210/659 |
| 6,083,670 A | 7/2000 | Sugawara et al. | 430/399 |
| 6,093,317 A | 7/2000 | Capelle et al. | 210/198.2 |
| 6,096,218 A | 8/2000 | Hauck et al. | 210/659 |
| 6,099,654 A | 8/2000 | Kaneko et al. | 127/46.2 |

OTHER PUBLICATIONS

Adachi, "Review: Simulated Moving–Bed Chromatography for Continuous Separations of Two Components and Its Application to Bioreactors," *J. Chromatogr. A*, 1994; 658:271–282.

"ADSIM™ User Manual," Aspen Technology, Cambridge, MA. 1994; Cover page, Publication page, and Table of Contents only (6 pgs).

Agosto et al., "Amino Acid Separation in a Multistage Fluidized Ion Exchanger Bed," *Ind. Engr. Chem. Res.*, 1993; 32:2058–2064.

Agosto et al., "Moving Withdrawal Liquid Chromatography of Amino Acids," *Ind. Engr. Chem. Research.*, 1989; 28:1358–1364.

(List continued on next page.)

*Primary Examiner*—Ernest G. Therkorn
(74) *Attorney, Agent, or Firm*—Mueting, Raasch & Gebhardt, P.A.

(57) ABSTRACT

Systems and processes are provided that are useful for separating components from feed streams containing multiple components. Systems and processes of the present invention are based on simulated moving bed technology.

9 Claims, 14 Drawing Sheets

OTHER PUBLICATIONS

Arumugam et al., "Pressure Behavior During the Loading of Adsorption Systems," *Fundamentals of Adsorption,* LeVan, ed., Kluwer, Boston, 1996;51–58.

Arumugam et al., "Pressure Effects in Adsorption Systems," *Adsorption*, 1999; 5:261–278.

Arumugam et al., "Pressure Transients in Gas Phase Adsorptive Reactors," *Adsorption*, 1998; 4:345–354.

Arumugam et al., "Technical Note: Proposed Operation of Large–Scale Isotachophoresis," *Separ. Sci. Technol.*, 1998; 33(10):1567–1570.

Asenjo, Ed., *Separation Processes in Biotechnology*, Marcel Dekker, New York, 1990; Cover page, Publication page, and Table of Contents only (4 pgs.).

Balannc et al., "Chapter 14: From Batch Elution to Simulated Countercurrent Chromatography," *Preparative Production Scale Chromatography*, Ganetsos, ed., Marcel Dekker, New York, 1993, 301–357.

Bidlingmeyer ed., *Preparative Liquid Chromatography*, 1987; Elsevier, Amsterdam, Cover page, Publication page, and Table of Contents only (4 pgs).

Byrne et al., "Pressure Effects in Adsorbers and Adsorptive Reactors," *Separ. Sci. Technol.*, 2000; 35(3):323–351.

Chiang, "Continuous Chromatographic Process Based on SMB Technology," *AIChE J.* Aug. 1998; 44(8): 1930–1932.

Ching et al., "Comparative study of Flow Schemes for a Simmulated Countercurrent Adsorption Separation Process," *AIChE J.*, Nov. 1992.; 38(11):1744–1750.

Ching et al., "Experimental Study of a Simulated Counter–Current Adsorption System, III. Sorbex Operation," *Chem. Engr. Sci.*, 1985; 40(8):1411–1417.

Ching et al., "Multicomponent separation using a Column–Switching Chromatographic Method," *AIChE J.*, Nov. 1994; 40(11):1843–1849.

Dechow, *Separation and Purification Techniques in Biotechnology*, Noyes Publications, Park Ridge, NJ, 1989; Cover page, Publication page, and Table of Contents only (6 pgs.).

Derez–Cerestar, "Principle and industrial applications of chromatography in the starch industry," Apr. 28, 1995; 3:1–9, and 12 pgs of slides.

de Rosset et al., "Industrial Applications of Preparative Chromatography," *Percolation Processes: Theory and Applications*, Rodrigues et al., eds., Sijthoff & Noordhoff, Alphen ann den Rijn, The Netherlands, 1981; 249–281.

Deutscher, ed., *Methods in Enzymology*, vol. 182, *Guide to Protein Purification*, Academic Press, San Diego, 1990; Cover page, Publication page, and Table of Contents only (6 pgs.).

Ernest et al., "Development of a Carousel Ion–Exchange Process for Removal of Cesium–137 from Alkaline Nuclear Waste," *Ind. Engr. Chem. Research*, 1997; 36:2775–2788.

Ernst et al., "Study of Simulated Moving–Bed Separation Processes Using a Staged Model," *Ind. Engr. Chem. Res.*, 1989; 28:1211–1221.

Ernst et al., "Theoretic study of Backmixing in Simulated Moving–Bed Adsorption Process with Multiple Equilibrium Stages Between Ports," *Separ. Tech.*, Oct. 1992; 2:197–207.

Ganetsos et al., eds., *Preparative and Production Scale Chromatography*, Marcel Dekker, New York, 1993; Cover page, Publication page, and Table of Contents only (5 pgs.).

Geldart et al., "Non–Linear Analysis of Multicomponent Moving Withdrawl and Moving Port Chromatography," *Chem. Engr. Communications*, 1987; 58:273–285.

Grushka, ed., *Preparative–Scale Chromatography*, Marcel Dekker, New York, 1989; Cover page, Publication page, and Table of Contents only (5 pgs.).

Hashimoto et al., "Chapter 13: Operation and Design of Simulated Moving–Bed Adsorbers," *Preparative and Production Scale Chromatography*, Ganetsos et al., eds., Marcel Dekker, New York, 1993, 273–300.

Hashimoto et al., "Models for Separation of Glucose/Fructose Mixture Using a Simulated Moving–Bed Adsorber," *J. Chem. Engr. Japan*, 1983; 16(5):400–406.

Hassan et al., "Optimization of Continuous Countercurrent Adsorption Systems," *Separation Technology*, 1996; 6:19–27.

Horváth et al., *Chromatography in Biotechnology*, ACS Symposium Series No. 529, American Chemical Society, Washington, DC, 1993; (3 pgs.).

Janson et al., "Large–scale Chromatography of Proteins," *Advances in Biochemical Engineering*, Fiechter eds., *Chromatography*, Springer–Verlag, Berlin, 1982, 125:43–99.

Kloppenburg et al., "Communications: A New Concept for Operating Simulated Moving–Bed Processes" *Chem. Eng. Technol.*, 1999; 22:813–817.

Koh et al., "Pore and Surface Diffusion in Bulk–Phase Mass Transfer in Packed and Fluidized Beds," *Ind. Engr. Chem. Res.*, 1998; 37:228–239.

Kubota et al., "Review: Preparative Chromatographic Separations with Moving Feed Ports," *J. Chromatogr.*, 1994; A, 658:259–270.

Lapidus et al., "Mathematics of adsorption in beds. IV The effect of longitudinal diffusion in ion exchange and chromatographic columns," *Phys. Chem*, 1952; 56:984–88.

Locke et al., "A Theoretical and Experimental Study of Counteracting Chromatographic Electrophoresis," *Separation Purification Methods*, 1989; 18(1):1–64.

Ma et al., "Standing Wave Analysis of SMB Chromatography: Linear Systems," *AIChE J.*, 1997; 43(10):2488–2508.

Matsuda, "Multicomponent Separation by a Novel Simulated Moving Bed System," ACS National Meeting, New Orleans, Mar. 1996; (4 pgs.).

Migliorini et al., "Robust Design of Countercurrent Adsorption Separation Processes: 5. Nonconstant Selectivity," *AIChE J.*, Jul. 2000; 46(7):1384–1333.

"New Simulated Moving–Bed System for Fractionation of Multicomponent Mixture," Product Information. Organo Corporation. Tokyo, Japan, (6 pgs.) (Undated).

Nicoud, "The Simulated Moving Bed: A Powerful Chromatographic Process," *LC–GC*, 1992; 5:43–47.

Nicoud et al., "Simulated Moving Bed Chromatography for Preparative Separations" *LC–GC*, Jul. 2000; 18(7):680–687. [online]. Column Watch, 2000 [retrieved on Oct. 9, 2000]. Retrieved from the Internet: <URL:http://www.chromatographyonline.com/articles/0007_articles/0007_colu-mn-watch>. (10 pgs.).

NSF Annual Report for Period: Jul. 1999–Jun. 2000, Wankat, principal investigator, Aug. 16, 2000, 3 pgs.

NSF Award Abstract—#9815844: Multicomponent SMB/Chromatographic Separations, [online]. FastLane. [retrieved on Jul. 5, 2002]. Retrieved from the Internet: <https://www.fastlane.nsf.gov/servlet/showaward?award=9815844>/ (1 pg.).

Pais et al., "Modeling Strategies for Enantiomers Separation by SMB Chromatography," *AIChE J.*, Mar. 1998; 44(3):561–569.

Parkinson et al., "Chromatographers Think Big," *Chem. Engr.*, Aug. 1994:30–33.

Parkinson et al., "The Divide in Distillation" *Chemical Engineering*, Apr. 1999: 32,33 & 35.

Perry, ed., *Perry's Chemical Engineers' Handbook, Seventh Edition*, McGraw–Hill, New York, 1997; Cover page, Publication page, and Table of Contents only (4 pgs.).

Pynnonen (Organizer), Symposium on Industrial Scale Process Chromatographic Separations, ACS National Meeting, New Orleans, Mar. 1996. (19 pgs.).

Rossiter, "ISEP & CSEP a Novel Separation Technique for Processing Engineers," Prsentation to Israeli Mining Institution, Preprint from Advanced Separations Technology, Inc., Lakeland, FL, Dec. 1966; 1–28.

Rossiter et al., "Continuous Process Separation: Chiral & Chromatographic with CSEP™ and ISEP™," Advanced Separation Technologies, Inc., Lakeland FL, Jul. 18, 1997.

Ruthven, *Principles of Adsorption & Adsorption Processes*, Wiley–Interscience, New York, 1984; Cover page, Publication page, and Table of Contents only (6 pgs.).

Ruthven et al., "Review Article No. 31: Counter–current and simulated counter–current adsorption separation processes," *Chem. Engr. Sci.*, 1989; 44(5):1011–1038.

Simms et al., "Modified Displacement Chromatography Cycles for Gas Systems," *Chem. Engr. Sci.*, 1996; 51(5):701–711.

"Simulated Moving Bed Chromatography," [online]. Product Information. Aerojet Fine Chemicals. [retrieved on Oct. 9, 2000]. Retrieved from the Internet: <URL:http://www.aerojetfinechemicals.com/smbtheory.html>. (21 pgs.).

Storti et al., "Design of Optimal Operating Conditions of Simulated Moving Bed Adsorptive Separation Units," *Ind. Eng. Chem. Research*, 1995; 34:288–301.

Storti et al., "Optimal Design of Multicomponent Countercurrent Adsorption Separation Processes Involving Nonlinear Equilibria," *Chem. Engr. Sci.*, 1989; 44(6):1329–1345.

Storti et al., "Robust Design of Binary Counter current Adsorption Separation Processes," *AIChE J.*, Mar. 1993; 39(3):471–492.

Subramanian, ed., *Preparative and Process–Scale Liquid Chromatography*, Ellis Horwood, New York, 1991; Cover page, Publication page, and Table of Contents only (4 pgs.).

Subramanian, ed., *Process Scale Liquid Chromatography*, VCH, Weinheim, Germany, 1995; Cover page, Publication page, and Table of Contents only (8 pgs.).

Sundaram et al., "Dynamics of the Irreversible Michaelis–Menten Kinetic Mechanism," *J. Phys. Chem. A*, 1998; 102:717–721.

Wankat, "Improved Efficiency in Preparative Chromatographic Columns Using a Moving Feed," *Ind. Engr. Chem. Fundam.*, 1977; 16(4):468–472.

Wankat, "Improved Preparative Chromatography: Moving Port Chromatography," *Ind. Engr. Chem. Fundamentals*, 1984; 23:256–260.

Wankat, *Large–Scale Adsorption and Chromatography*, vols. I and II; CRC Press, Boca Raton, FL, 1986; Cover page, Publication page, and Table of Contents only (6 pgs.).

Wankat et al., "New SMB Operation Strategy—Partial feed" [online]. Presented at AICHE 2000 National Meeting, Nov. 16, 2000. [available online Apr. 2000]. Retrieved from the Internet: <URL:http://aiche.org>. Abst. (2 pgs.).

Wankat, "Operational Techniques for Adsorption and Ion Exchange," *Proceedings, Corn Refiner's Assoc.*, Washington, D.C. 1982 Scientific Conference, Lincolnshire, Ill. Jun. 16–18, 1982; 119–67.

Wankat, *Rate–Controlled Separations*, Elsevier Applied Science, London, 1990; Cover page, Publication page, and Table of Contents only (7 pgs.).

Wooley et al., "A Nine–Zone Simulating Moving Ben for the Recovery of Glucose and Xylose from Biomass Hydrolyzate" *Ind. Engr. Res.*, 1998; 37:3699–3709.

Yun et al., "Simulated Moving Bed Under Linear Conditions: Experimental vs. Calculated Results," *AIChE Journal*, Apr. 1997; 43(4):935–945.

Zang, "Improvement of SMBs," Poster session at Purdue University to Industrial Sponsors, Aug. 1999, (21 pgs.).

Zang, "Improvement of SMBs," Poster session at Purdue University to Industrial Sponsors, Aug. 2000, (11 pgs.).

Zhong et al., "Analytical Solution for the Linear Ideal Model of Simulated Moving Bed Chromatography," *Chem. Engr. Sci.*, 1996; 51(18):4307–4319.

Zhong et al., "Simulated Moving Bed Chromatography: Effects of Axial Dispersion and Mass Transfer Under Linear Conditions," *Chem. Engr. Sci.*, 1997; 52(18):3117–3132.

Dünnebier et al., "Computationally efficient dynamic modelling and simulation of simulated moving bed chromatographic processes with linear isotherms," *Chem. Eng. Sci.*, 1998;53(14):2537–46.

Gunaseelan et al., "Dynamic Tray Model to Predict Start–Up Transients in Concentrated Absorbers," *Ind. Eng. Chem. Res.*, 2000; 39:2525–2533.

Koppenburg et al. Ein neues Prozessführungskonzept für die Chromatographie mit simuliertem Gegenstrom in: *Chemie–Ingenieur–Technik*, 1998;70(12):1526–1529; including English version of publication (Koppenburg et al. "A New Concept for Operating Simulated Moving–Bed Processes," *Chem. Eng. Techno. 1999*; 22(10):813–817).

Wankat et al., "Mass Transfer," Section 5B, *Perry's Handbook of Chemical Engineering*, 7$^{th}$ Edition, Green, ed., McGraw–Hill, New York, 1997; pp. 5–42 to 5–79.

Wankat, *Rate–Controlled Separations*, Chapman & Hall, London, 1990, Chapters 6 & 7:pp. 217–364.

SYSTEMS AND PROCESSES FOR PERFORMING SEPARATIONS USING A SIMULATED MOVING BED APPARATUS

RELATED APPLICATIONS

This application claims the benefit of the U.S. Provisional Application No. 60/249,063, filed Nov. 15, 2000, which is incorporated by reference in its entirety.

GOVERNMENT FUNDING

The present invention was made with government support under Grant No. CTS 9815844, a GOALI grant awarded by the National Science Foundation. The Government may have certain rights in this invention.

BACKGROUND

Simulated Moving Bed (SMB) technology for adsorption processing was first developed in the late 1950s for the separation of petrochemicals. Since that time, a number of SMB systems have been commercialized and the method has been applied to adsorption chromatography, ion exchange chromatography, ion exclusion chromatography, size exclusion chromatography and other chromatographic techniques. SMBs are currently used in the food, pharmaceutical, chemical, petrochemical, and other industries. The operating scheme for a binary separation is shown in FIG. 1. The boxes in the figures represent either adsorption columns, or sections of a column separated by a space with appropriate withdrawal and feed lines. The simulation of bed movement is obtained either by switching all the feed and withdrawal ports in the same direction as the fluid flow at regular switching times, $t_{sw}$, or by moving the adsorbent column. This switching can be seen by comparing the system in parts a, b, c, and d. Regions between withdrawal and feed points are called zones. Each zone has a different function in the separation. Although FIG. 1 shows a simple system with one column or section per zone, it is also common to have multiple columns or sections per zone. Upon completion of the steps in FIG. 1, the cycle repeats itself over and over. Eventually a cyclic steady state is reached and the average concentrations are similar to those that would be obtained if the bed were actually moving continuously. Thus, the movement of the bed is "simulated."

The four-zone system shown in FIG. 1 is an effective separation device. However, it is limited to binary separations. Thus, in FIG. 1 the feed (F) contains two solutes, A and B, that are split into an A product and a B product. If there is a third component in the feed, it will appear in one or both of the two product streams. Because ternary mixtures arise naturally, there is a desire for an effective ternary separation technique in many industries. The most obvious approach to separate ternary mixtures is to connect two 4-zone SMB systems together. The two obvious methods to do this are shown in FIG. 2. Solute A is the least strongly adsorbed, B is the middle solute, and C is the most strongly adsorbed solute. D is the desorbent, which in aqueous systems is often water. D may or may not be adsorbed. Although the switching of ports or movement of columns is not shown in FIG. 2, it is understood to occur. Multiple columns may be employed in each zone. The two trains may differ from each other and have different numbers of columns per zone, different column diameters and lengths, different adsorbents, and different switching times. The approaches shown in FIG. 2 are seldom employed in commercial practice, because the capital cost and desorbent usage for both schemes is high. Thus, there is major industrial interest in developing methods that are superior to those in FIG. 2.

SMB systems with different numbers of zones (e.g., 2, 3, 5, and 9) are also well known. A 3-zone system for binary separation is shown in FIG. 4. Two 3-zone systems could replace the 4-zone system in FIGS. 2(a) and 2(b).

An improved nine-zone system was recently developed. The scheme used a single train with nine zones and employed a recycle stream. A similar nine-zone scheme is redrawn in FIG. 3 using two trains to allow for more flexibility in operating conditions. FIG. 3 shows a method where the more strongly adsorbed components, B and C plus desorbent D, are fed to the second train. One can also build a scheme where the less adsorbed components, A and B plus desorbent D, are fed to the second train.

SUMMARY OF THE INVENTION

In one aspect, the present invention provides a system for performing a separation of a feed stream that contains at least three components. In one embodiment, the system includes a simulated moving bed separation apparatus adapted to discharge at least two streams, the at least two streams including a first discharge stream containing all the components except that it does not contain substantial amounts of a least retained component, and a second discharge stream containing all the components except that it does not contain substantial amounts of a most retained component, thus effecting a substantial separation of the least retained component from the most retained component.

In another embodiment, the system includes a first simulated moving bed separation apparatus and a second simulated moving bed separation apparatus, the first simulated moving bed separation apparatus adapted to discharge at least two streams, the at least two streams including a first discharge stream containing all the components except that it does not contain substantial amounts of a least retained component, and a second discharge stream containing all the components except that it does not contain substantial amounts of a most retained component, thus effecting a substantial separation of the least retained component from the most retained component. At least one of the first or second discharge streams becomes a feed stream for the second simulated moving bed separation apparatus. Optionally, the at least two streams from the first simulated moving bed separation apparatus include a third discharge stream that contains the least retained component and no substantial amounts of any other component and a fourth discharge stream that contains the most retained component and no substantial amounts of any other component. Preferably, the second simulated moving bed separation apparatus includes a first discharge stream containing all the components except that it does not contain substantial amounts of a least retained component, the second simulated moving bed separation apparatus further includes a second discharge stream containing all the components except that it does not contain substantial amounts of a most retained component, and wherein the second simulated moving bed separation apparatus further includes a third discharge stream taken from between the first and second feed streams of the second simulated moving bed separation apparatus. Preferably, the third discharge stream from the second simulated moving bed separation apparatus contains all the components except that it does not contain substantial amounts of either the least retained component or the most retained component. Optionally, the simulated moving bed separation apparatuses may be configured into a loop.

In another aspect, the present invention provides a process for performing a separation. In one embodiment, the process includes feeding a stream that contains at least three components into a simulated moving bed separation apparatus; substantially separating a least retained component from a most retained component; and discharging at least two streams. The at least two streams include a first discharge stream containing all the components except that it does not contain substantial amounts of the least retained component, and a second discharge stream containing all the components except that it does not contain substantial amounts of the most retained component.

In another embodiment, the process includes feeding a stream that contains at least three components into a first simulated moving bed separation apparatus; substantially separating a least retained component from a most retained component; discharging at least two streams, the at least two streams including a first discharge stream containing all the components except that it does not contain substantial amounts of the least retained component, and a second discharge stream containing all the components except that it does not contain substantial amounts of the most retained component; and delivering at least one of the first or second discharge streams as a feed stream for a second simulated moving bed separation apparatus. Optionally, the at least two streams from the first simulated moving bed separation apparatus include a third discharge stream that contains the least retained component and no substantial amounts of any other component and a fourth discharge stream that contains the most retained component and no substantial amounts of any other component. Preferably, the second simulated moving bed separation apparatus includes a first discharge stream containing all the components except that it does not contain substantial amounts of a least retained component, the second simulated moving bed separation apparatus further includes a second discharge stream containing all the components except that it does not contain substantial amounts of a most retained component, and wherein the second simulated moving bed separation apparatus further includes a third discharge stream taken from between the first and second feed streams of the second simulated moving bed separation apparatus. Preferably, the third discharge stream from the second simulated moving bed separation apparatus contains all the components except that it does not contain substantial amounts of either the least retained component or the most retained component. Optionally, the simulated moving bed separation apparatuses may be configured into a loop.

In another aspect, the present invention provides a process for feeding a simulated moving bed separation apparatus. The process includes providing a simulated moving bed separation apparatus having a switch time $t_{sw}$, a normal feed flow rate $r_n$, a desorbent flow rate, a raffinate flow rate, and an extract flow rate; feeding a stream that contains at least two components into the simulated moving bed separation apparatus for a partial feed time $t_{pf}$ at a partial feed flow rate $r_{pf}$, wherein the partial feed time $t_{pf}$ is less than the switch time $t_{sw}$; and maintaining at least one of the flow rates for desorbent, raffinate, or extract at the normal rate for normal feed flow conditions. Preferably, the process includes maintaining the flow rates for desorbent and extract at normal rates for normal feed flow conditions. Preferably, the partial feed flow rate $r_{pf}$ is about equal to or greater than the product of the switch time $t_{sw}$ and the normal feed flow rate $r_n$ divided by the partial feed time $t_{pf}$.

In another aspect, the present invention provides a process for increasing the purity of the most retained component from a simulated moving bed separation apparatus compared to the purity of the component under normal operating conditions. The process includes providing a simulated moving bed separation apparatus having a switch time $t_{sw}$ and a normal feed flow rate $r_n$; and feeding a stream that contains at least two components into the simulated moving bed separation apparatus for a partial feed time $t_{pf}$ at a partial feed flow rate $r_{pf}$, wherein the partial feed time $t_{pf}$ is less than the switch time $t_{sw}$, and the majority of the feed occurs in the first half of the switch time.

In another aspect, the present invention provides a process for increasing the recovery of the least retained component from a simulated moving bed separation apparatus compared to the recovery of the component under normal operating conditions. The process includes providing a simulated moving bed separation apparatus having a switch time $t_{sw}$ and a normal feed flow rate $r_n$; and feeding a stream that contains at least two components into the simulated moving bed separation apparatus for a partial feed time $t_{pf}$ at a partial feed flow rate $r_{pf}$, wherein the partial feed time $t_{pf}$ is less than the switch time $t_{sw}$, and the majority of the feed occurs in the first half of the switch time.

In another aspect, the present invention provides a process for increasing the purity of the least retained component from a simulated moving bed separation apparatus compared to the purity of the component under normal operating conditions. The process includes providing a simulated moving bed separation apparatus having a switch time $t_{sw}$ and a normal feed flow rate $r_n$; and feeding a stream that contains at least two components into the simulated moving bed separation apparatus for a partial feed time $t_{pf}$ at a partial feed flow rate $r_{pf}$, wherein the partial feed time $t_{pf}$ is less than the switch time $t_{sw}$, and the majority of the feed occurs in the last half of the switch time.

In another aspect, the present invention provides a process for increasing the recovery of the most retained component from a simulated moving bed separation apparatus compared to the recovery of the component under normal operating conditions. The process includes providing a simulated moving bed separation apparatus having a switch time $t_{sw}$ and a normal feed flow rate $r_n$; and feeding a stream that contains at least two components into the simulated moving bed separation apparatus for a partial feed time $t_{pf}$ at a partial feed flow rate $r_{pf}$, wherein the partial feed time $t_{pf}$ is less than the switch time $t_{sw}$, and the majority of the feed occurs in the last half of the switch time.

In another aspect, the present invention provides a process for increasing the purity and recovery of the most and the least retained components from a simulated moving bed separation apparatus compared to the purity and recovery of the most and the least retained components under normal operating conditions. The process includes providing a simulated moving bed separation apparatus having a switch time $t_{sw}$ and a normal feed flow rate $r_n$; and feeding a stream that contains at least two components into the simulated moving bed separation apparatus for a partial feed time $t_{pf}$ at a partial feed flow rate $r_{pf}$, wherein the partial feed time $t_{pf}$ is less than the switch time $t_{sw}$, and the majority of the feed occurs in the middle two quarters of the switch time.

This feed process is applicable to all types of SMB systems including binary separations, multi-component separations, and any number of zones. This process can also be used for the feed to the second train, the third train, or any train of a cascade system (e.g., FIGS. 7–12). For this case, the discharges can be collected in separate tanks, then the new feed process can be used. The feed process may be particularly useful, for example, in high pressure liquid chromatography (HPLC) and supercritical fluid separations.

In another aspect, the present invention provides a process for performing a separation. The process includes providing a simulated moving bed separation apparatus having a switch time $t_{sw}$ and a normal feed flow rate $r_n$; feeding a stream that contains at least two components into the simulated moving bed separation apparatus for a partial feed time $t_{pf}$ at a partial feed flow rate $r_{pf}$, wherein the partial feed time $t_{pf}$ is less than the switch time $t_{sw}$; substantially separating a least retained component from a most retained component; and discharging at least two streams, the at least two streams including a first discharge stream containing all the components except that it does not contain substantial amounts of the least retained component, and a second discharge stream containing all the components except that it does not contain substantial amounts of the most retained component. Preferably, the partial feed flow rate $r_{pf}$ is about equal to the product of the switch time $t_{sw}$ and the normal feed flow rate $r_n$ divided by the partial feed time $t_{pf}$.

Definitions

As used herein, "SMB" means "simulated moving bed."

As used herein, "switch time ($t_{sw}$)" means the total time between activation of switching valves to change flow between columns.

As used herein, "normal feed flow rate ($r_n$)" means the volumetric rate of flow of feed being introduced into the SMB when feed is introduced into the SMB during the entire switch cycle under standard operating conditions.

As used herein, "partial feed time ($t_{pf}$)" means the length of time that feed is introduced during each switching cycle.

As used herein, "partial feed flow rate ($r_{pf}$)" means the volumetric rate of flow of feed being introduced into the SMB during the partial feeding time.

As used herein, "raffinate" is a product stream pumped from the SMB during operation that corresponds to the least retained component.

As used herein, "extract" is a product stream pumped from the SMB during operation that corresponds to the most retained component.

As used herein, "desorbent" is an eluent or mobile phase used to carry out the separation by moving the solute through a column.

As used herein, "partial feed system" means an SMB system that has a partial feed time $t_{pf}$ at a partial feed flow rate $r_{pf}$, wherein the partial feed time $t_{pf}$ is less than the switch time $t_{sw}$. Preferably, the partial feed flow rate $r_{pf}$ is about equal to or greater than the product of the switch time $t_{sw}$ and the normal feed flow rate $r_n$ divided by the partial feed time $t_{pf}$.

The present invention provides for separation of components from a stream containing at least three components (e.g., A, B, . . . , and Z) resulting in at least two streams, one stream containing all the components except that it does not contain substantial amounts of the least retained component (A), and another stream containing all the components except that it does not contain substantial amounts of the most retained component (Z), thus effecting a separation of the least retained component (A) from the most retained component (Z). For example, an easy split of a stream containing a ternary mixture of A, B, and C results in one stream containing A and B, and another stream containing B and C. Similarly, an easy split of a stream containing a quaternary mixture of A, B, C, and Z results in one stream containing A, B, and C, and another stream containing B, C, and Z.

As used herein, the expressions "containing all the components" and "comprising all the components" are used interchangeably, and refer to the compositions of the indicated streams. The terms are not meant to imply that the entire amount of any component is present in the indicated stream.

As used herein, "substantial separation of two components" means that each component contains no more than about 20% by weight of the other component, preferably no more than about 5% by weight of the other component, and more preferably no more than about 1% by weight of the other component As used herein, "a stream that does not contain substantial amounts of a component" means that the stream contains at most about 20% by weight of the component, preferably at most about 5% by weight of the component, and more preferably at most about 1% by weight of the component.

BRIEF DESCRIPTION OF THE FIGURES

FIG. 2 is an illustration of simulated moving bed ternary separation systems where F is the feed, A is the least strongly adsorbed solute, B is the middle solute, C is the most strongly adsorbed solute, and D is the desorbent.

FIG. 15 illustrates plots of raffinose purity (A, solid line), dextran T6 purity (B, solid line), dextran T6 recovery (C, dashed line), and raffinose recovery (D, dashed line) vs. feed length and feed time.

DETAILED DESCRIPTION OF THE PREFERRED EMBODIMENTS

Figure 1:
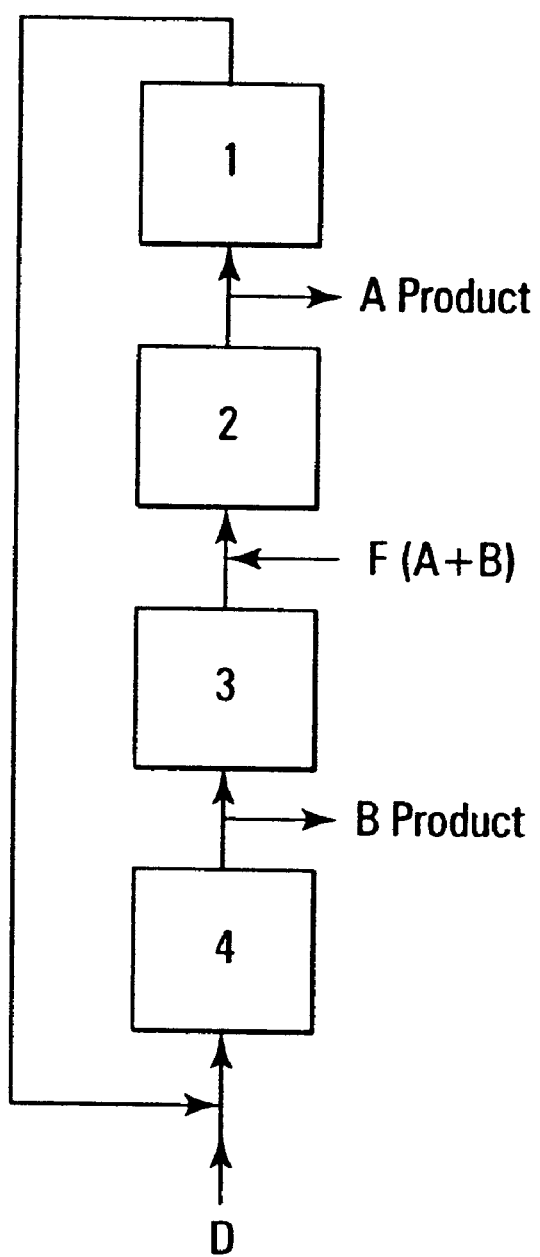
FIG. 1 is a schematic diagram of a prior art four-zone simulated moving bed binary separation system.

Batch, continuous or simulated moving bed systems designed for the chromatographic separation of mixture components often consist of one or more beds of solid separator medium (sorbent). Sorbent bed systems representative of the types contemplated by this invention are disclosed in U.S. Pat. Nos. 2,985,589; 3,831,755; 4,400,278; 4,404,037; 4,011,113; 4,182,633; 4,247,636; 4,412,866; 4,501,814; and 4,511,476, the disclosures of which are incorporated by reference for their teachings concerning sorbent beds generally and the use of such beds in industrial scale operations.

Simulated moving bed (SMB) technology is well developed for applications involving separating the components of a fluid. Typical applications of simulated moving bed chromatography include, for example, the separation of fructose from fructose-glucose solutions and the separation of sucrose from sugar beet or sugar cane syrups. Ion exchange resins may be employed as sorbents for these applications. Solution components are differentially absorbed by the ion exchange resin so that a separation waveform develops within the simulated moving bed.

A typical simulated moving bed apparatus consists of several compartments or zones (or individual columns) filled with solid sorbent. A fluid conduit interconnects the upstream and downstream ends of the system to form a loop through which fluid is continuously recirculated. The constant flow of fluid through the loop is called "internal recirculation flow." A manifold system of pipes and valves is provided selectively to position an inlet for feed material, an inlet for desorbent, an outlet for a sorbed component and an outlet for a nonsorbed (or less sorbed) component. Each inlet and outlet communicates with a separate bed compartment. Feed material enters the system at a designated compartment and is moved through the sorbent by the continuous internal recirculation flow. This moving contact results in a chromatographic separation of components. Sorbed component(s) which flow(s) at a relatively slow rate is removed from the sorbed component outlet. Nonsorbed component(s) which flow(s) at a relatively fast rate is removed from the nonsorbed component outlet. Desorbent is added at its inlet valve between the respective outlet valve positions of the sorbed and nonsorbed components.

At predetermined time intervals (switch time) the designated inlet and outlet valve positions are displaced downstream one position on the manifold to the next sorbent bed compartment, which may be a discrete section of a vessel, (such as a column), or an individual vessel, e.g., column. The step time is chosen such that the designation of valves is properly synchronized with the internal recirculation flow. Under these conditions the system eventually reaches a steady state with specific product characteristics appearing at predetermined intervals in sequence at each valve position. This type of system simulates valves held in a single position while the solid sorbent moves at a constant and continuous rate around the recirculation loop producing constant quality product at each valve. An alternative, also well known, actually intermittently moves the columns—often mounted on a carousel—while the valve locations are fixed.

The simulated version more closely approaches the character of an actual moving bed system as the number of compartments and valve positions increase. An important distinction between batch and simulated moving bed systems is that the internal recirculation flow is continuous in the simulated moving bed process. Except for very small adjustments to control internal pressure, the entering and exiting flow rates are continuous and constant, thereby approximating an actual moving bed system as closely as possible.

An equilibrated SMB system exhibits a steady state component separation waveform along the path of the recirculation loop. This waveform moves along the path of the recirculation loop with valve switching synchronized to maintain the desired steady state.

Partial Feed

The normal method for feeding an SMB is the total feed method as illustrated in FIG. 1. Feed is input during the entire time between the switching of port locations (e.g., all of part a, all of part b, etc.). When the port location is switched, the feed is input at a new location.

Figure 5:
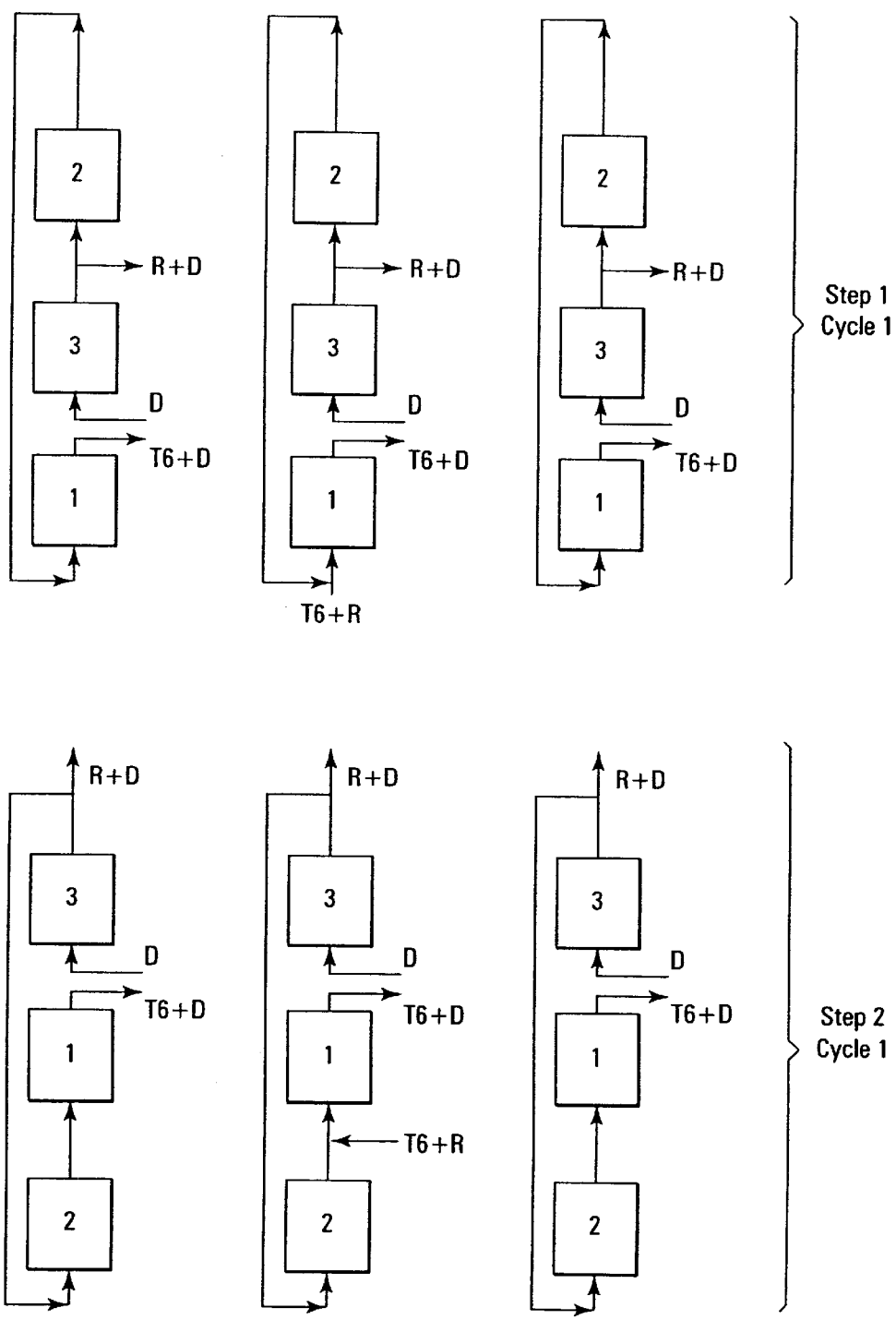
FIG. 5 is a schematic diagram of an embodiment of the present invention including a three-zone simulated moving bed partial feed system in which the feed under partial feed conditions ($r_{pf}*t_{pf}$) is equal to the feed under total feed conditions ($r_n*t_{sw}$). Dextran T6 (T6) is the less strongly adsorbed solute, raffinose (R) is the more strongly adsorbed solute, and the desorbent is D.
Figure 6:
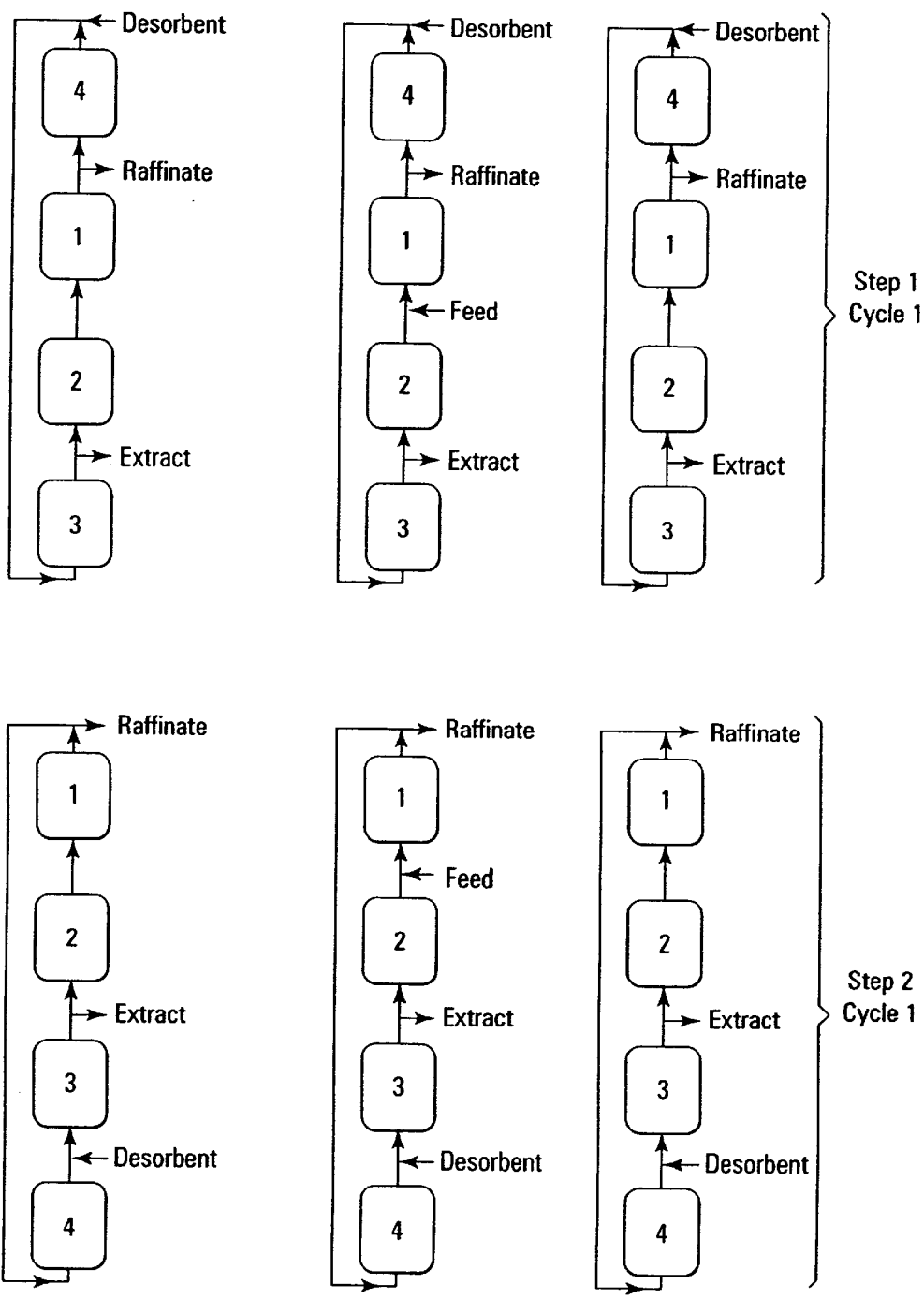
FIG. 6 is a schematic diagram of an embodiment of the present invention including a four-zone simulated moving bed partial feed system in which the feed under partial feed conditions ($r_{pf}*t_{pf}$) is equal to the feed under total feed conditions ($r_n*t_{sw}$).

The partial feed process for the SMB is shown in FIGS. 5 and 6. The feed is input during only a portion of the time between the switching of ports. Thus, if the switch time is divided into three parts (see FIG. 6), during the first part there is no feed added, and fluid discharges from zone 2 is fed directly to zone 1. During the second part, feed is added to the fluid between zones 1 and 2. During the third part there is no feed addition. Either the first or third part may be of zero time duration (e.g., they don't exist). The designer can optimize the system by changing the duration of all parts and the feed rate. The feed rate is preferably adjusted so that the total amount of feed for the process illustrated in FIG. 6 is substantially equivalent to or greater than the total amount of feed for the process illustrated in FIG. 1. The period of feed introduction, $t_{pf}$, and the relative lengths for the pre-feed and post-feed periods can be optimized. Calculations with two different models for binary separations with one column per zone show that partial feed to SMB processes improves the purity of the products for the same feed rate, the same amount of adsorbent, and the same amount of desorbent. Partial feed can also be used with more than one column per zone and for multicomponent separations.

The amount that the feed period can be decreased is practically limited by increasing flow rates in the feed column. The flow rate in the feed column increases as the feed period is shortened, causing the pressure drop to increase. As long as the pressure drop in the column receiving the feed (column 1) is less than or about equal to the pressure drop in the column being regenerated (column 3), the design is satisfactory. The operating data for commercial columns suggest that satisfactory systems can be designed with acceptable feed periods and flow rates. Shorter feed periods may also be made satisfactorily by adding a booster pump to the system to overcome pressure drop.

Separation Processes

Figure 8:
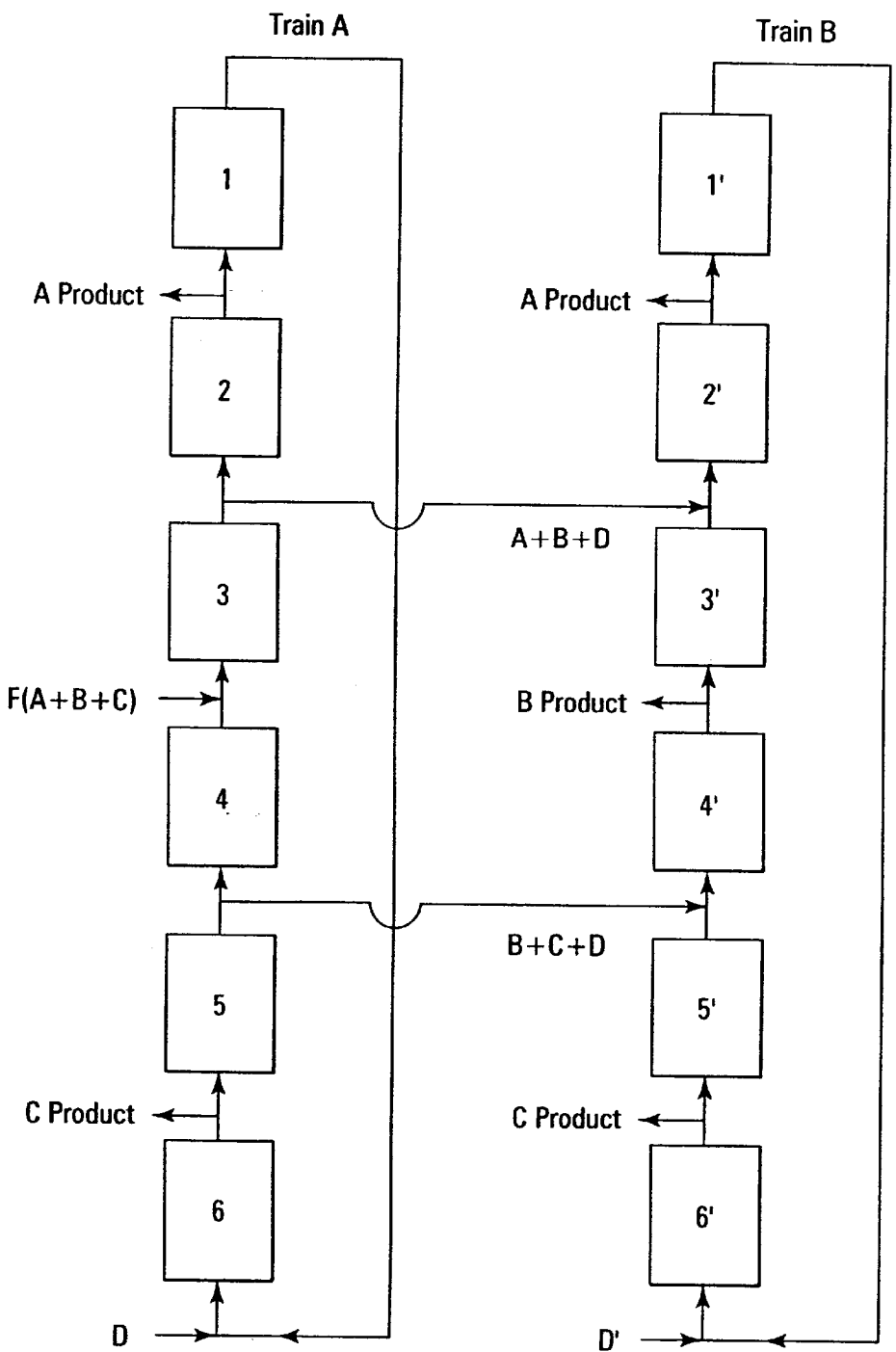
FIG. 8 illustrates an embodiment of the present invention as a schematic diagram of a twelve-zone, two-train simulated moving bed ternary separation system. Switching of ports is not shown, but should be understood to occur. F is the feed, A is the least strongly adsorbed solute, B is the middle solute, C is the most strongly adsorbed solute, and D is the desorbent.

In one aspect, the present invention discloses an SMB process that, although more complicated than the standard eight-zone processes (e.g., FIG. 2), uses less adsorbent and less desorbent, and produces more concentrated products. This twelve-zone process is shown in FIG. 8 for one switching period. The simulation of movement of the solids is done by periodically switching the port locations and moving them in the direction of fluid flow. There can be more than one column per zone.

The feed to the twelve-zone process is a ternary mixture with A being the least strongly adsorbed component and C the most strongly adsorbed. Train alpha receives the feed. Zones 3 and 4 do the simplest separation, that is the A–C separation. The purpose of zone 5 is to separate solutes B and C. Some of the B plus C mixture (also containing D) is sent to train beta. The C is desorbed from the column in zone 6 to regenerate the column. Some of this component C (including desorbent D) is withdrawn as product. At the top of train alpha, zone 1 adsorbs solute A so that desorbent can be recycled. Product A (+D) is withdrawn between zones 1 and 2. Zone 2 separates component A from component B. A mixture of A+B (also containing D) is sent to train beta.

In train beta, zones 1', 2', 5', and 6' have the same functions as in train alpha. Products containing A or C (both containing D also) are withdrawn between zone 1' and zone 2', and zone 5' and zone 6', respectively. Zone 3' separates components A and B while zone 4' separates components B and C. B product (including D) is withdrawn between zone 3' and zone 4'.

The amount of feed that can be added to an SMB depends upon the difficulty of the separation at the point where the feed is added. In FIG. 8, the separation at the feed point (A from C) is much easier than in a standard eight-zone ternary SMB (FIGS. 2(a) and 2(b)) where either the A–B or the B–C separation is done. Thus, almost twice as much feed can be added in the twelve-zone system as in the eight-zone system. The amounts of adsorbent and desorbent required in the twelve-zone system per kilogram (kg) of feed are significantly less than for the current eight-zone systems.

Figure 9:
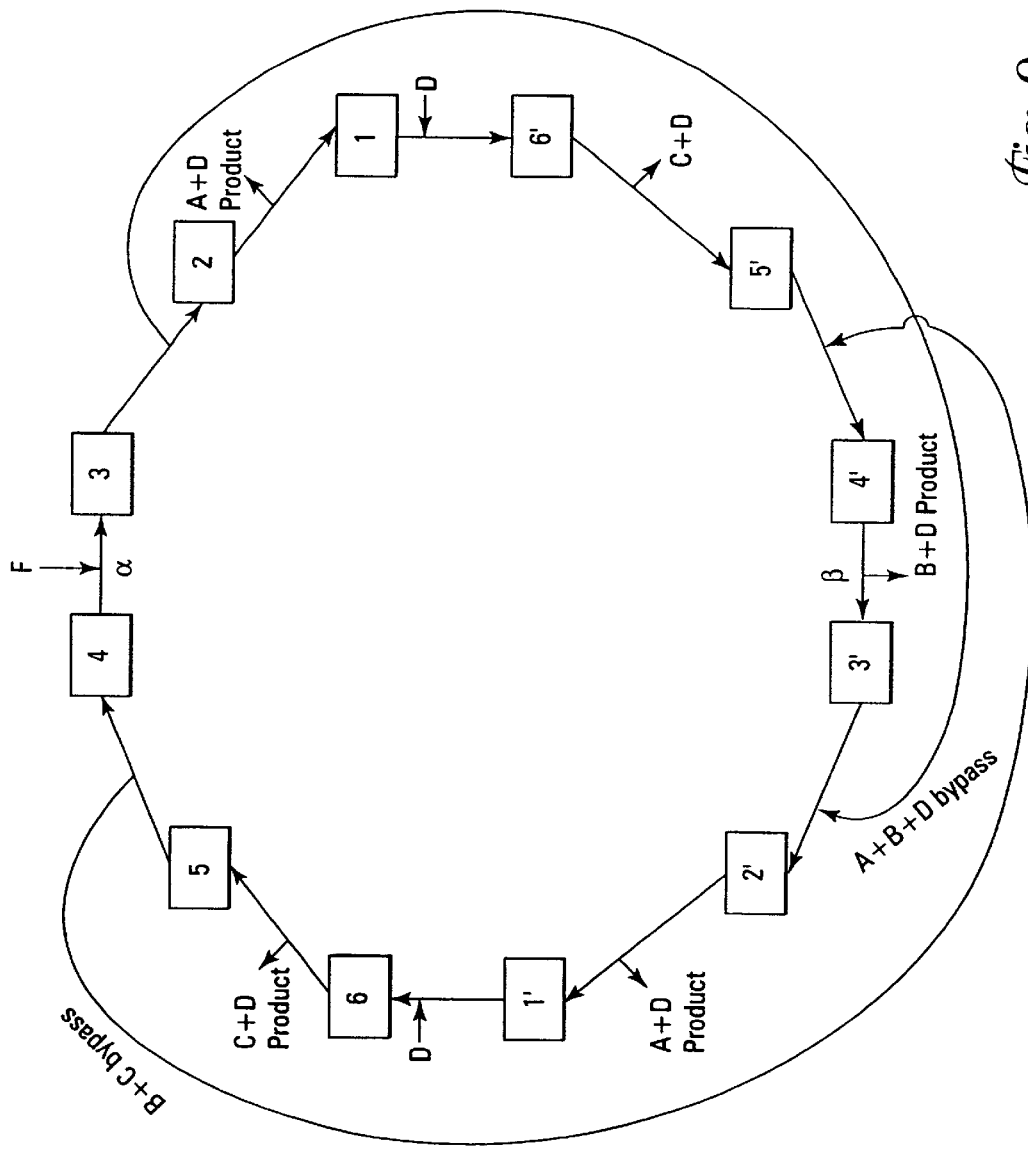
FIG. 9 illustrates an embodiment of the present invention as a schematic diagram of a twelve-zone simulated moving bed ternary separation system similar to that shown in FIG. 8, except that it is configured as a single-loop. Switching of ports is not shown, but should be understood to occur. F is the feed, A is the least strongly adsorbed solute, B is the middle solute, C is the most strongly adsorbed solute, and D is the desorbent.

A very similar system set up as a loop is shown in FIG. 9. Here the two trains are combined. The predicted values for the minimum amount of desorbent and for productivity for this system are almost identical to the values obtained for FIG. 8 (see Table 1). The configuration in FIG. 9 may be simpler to achieve with some equipment than the scheme in FIG. 8. However, the scheme in FIG. 8 has the advantage of allowing the use of different adsorbents in the two trains, and it can be operated in campaigns. For example, Train α may be operated alone by storing the A+B+D and B+C+D products in tanks in the first campaign. The first campaign can then be followed up by a second campaign using the same columns, but now configured as Train β, with the solutions from the tanks serving as the A+B+D and B+C+D feeds. The scheme based on campaigns thus reduces the total number of columns needed to operate the system.

TABLE 1

Comparison of SMB Processes Designed to Operate at Minimum Desorbent Rates at Ideal Conditions.

Figure 2A:
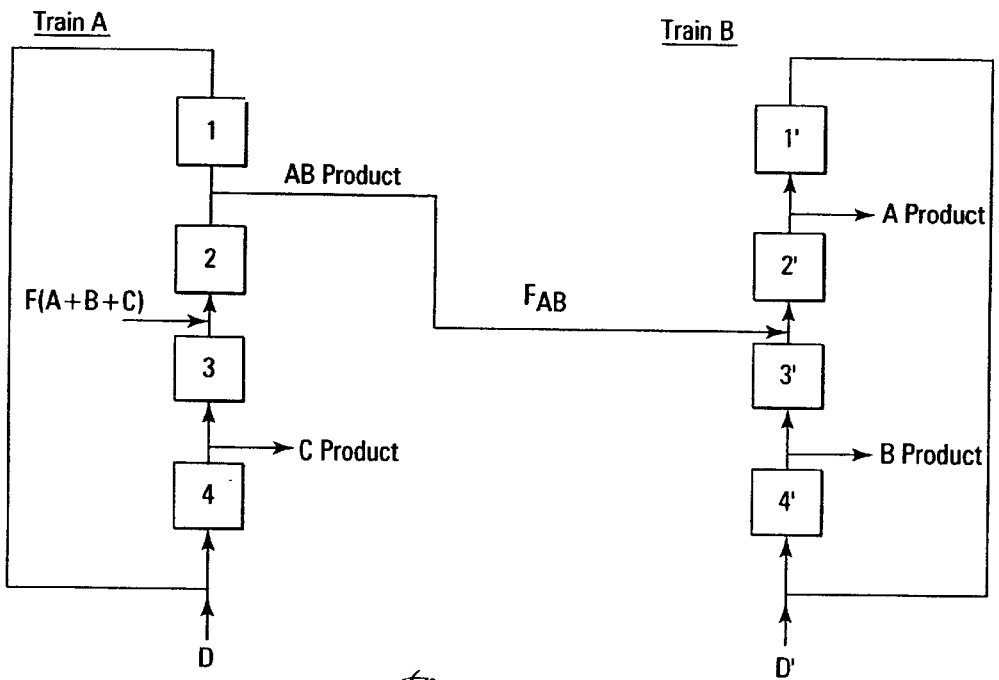
FIG. 2(a) is a schematic diagram of prior art simulated moving bed ternary separation systems combining two four-zone simulated moving bed apparatuses where the most strongly adsorbed species is removed in the first SMB. Switching of ports is not shown, but should be understood to occur.
Figure 2B:
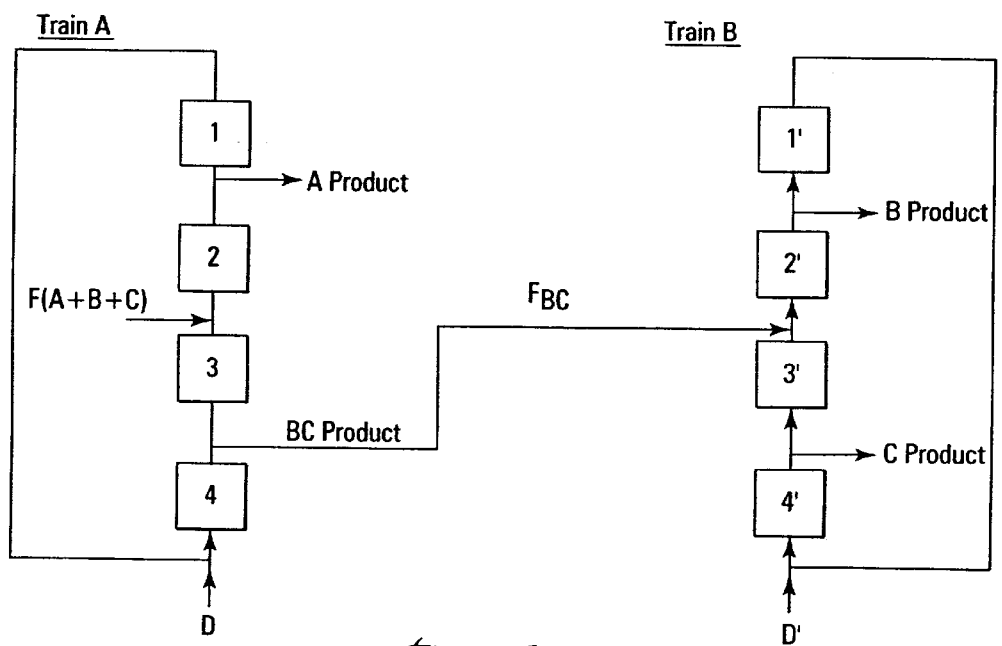
FIG. 2(b) is a schematic diagram of prior art simulated moving bed ternary separation systems combining two four-zone simulated moving bed apparatuses where the least strongly adsorbed species is removed in the first SMB. Switching of ports is not shown, but should be understood to occur.
Figure 3:
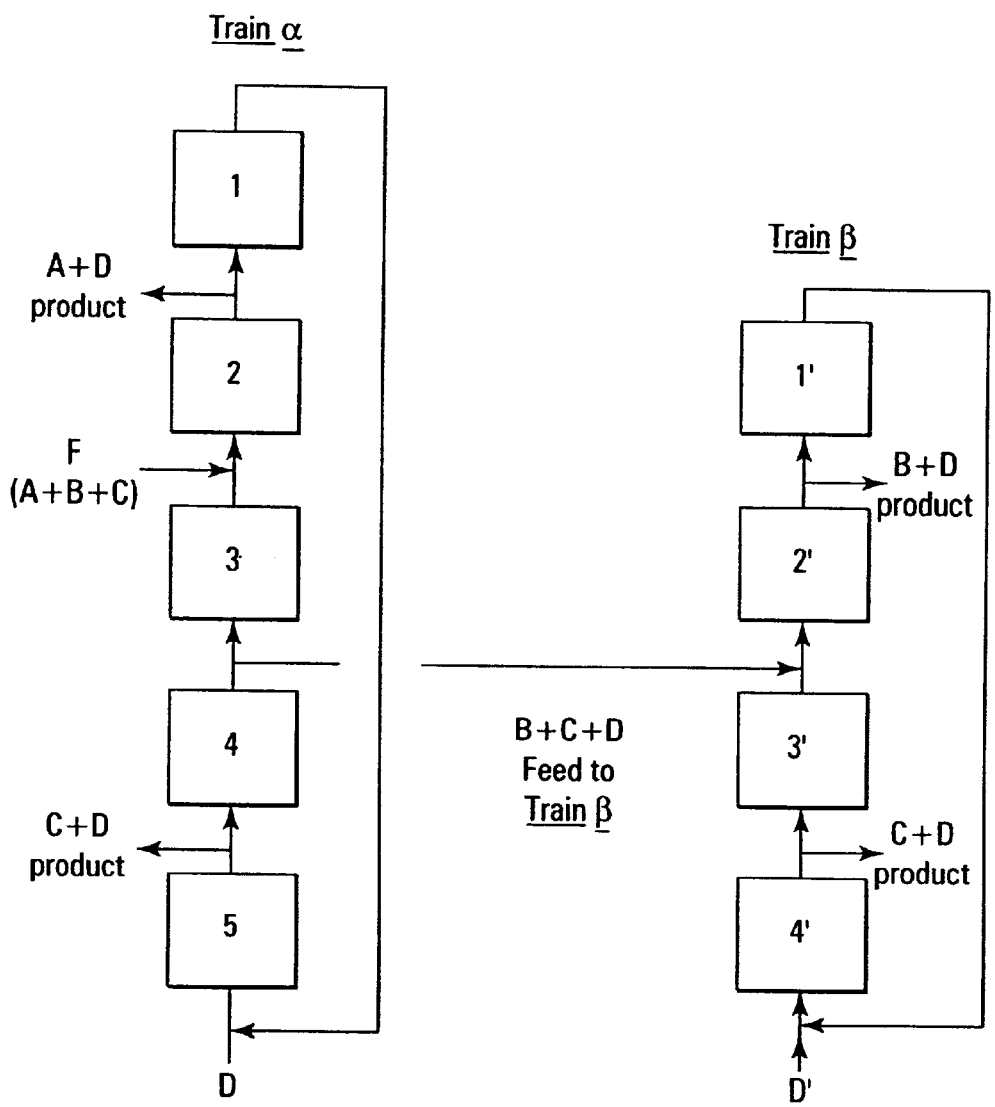
FIG. 3 is a schematic diagram of a prior art nine-zone simulated moving bed ternary separation system. Switching of ports is not shown, but should be understood to occur. F is the feed, A is the least strongly adsorbed solute, B is the middle solute, C is the most strongly adsorbed solute, and D is the desorbent.

| Process | Desorbent/Feed | Productivity, (1/min) |
| --- | --- | --- |
| FIG. 1, binary SMB (prior art) (B – C separation) | 1.0 | 0.01692 |
| FIG. 2b, first SMB, binary split (prior art) (separate A from B plus C) | 1.976 | 0.01733 |
| FIG. 2a, Binary split in first SMB for 8-zone ternary SMB (prior art) (separate A plus B from C) | 2.024 | 0.01692 |
| FIG. 8, first SMB, binary split (separate A from C in presence of B) | 1.0 | 0.02283 |
| FIG. 2(b), Std. 8-zone Ternary SMB (prior art) | 3.93 | 0.003122 |
| FIG. 3, 9-zone Ternary SMB (prior art). B + C fed to Col. 2. Modifies R. Wooley et al., Ind. Engr. Res., 37: 3699–3709 (1998) | 2.98 | 0.007619 |
| FIGS. 8 and 9, 12-zone, Easy-split SMB Ternary | 2.024* | 0.01128 |
| FIG. 7, 10-zone, Easy-split SMB Ternary | 3.024* | 0.008482 |
| FIG. 11, 6-zone, Easy-split SMB, followed by two 4-zone SMBs | 2.00 | 0.00984 |

*Not exact since minimum D is over-determined. Actual D/F may be smaller.

Figure 7:
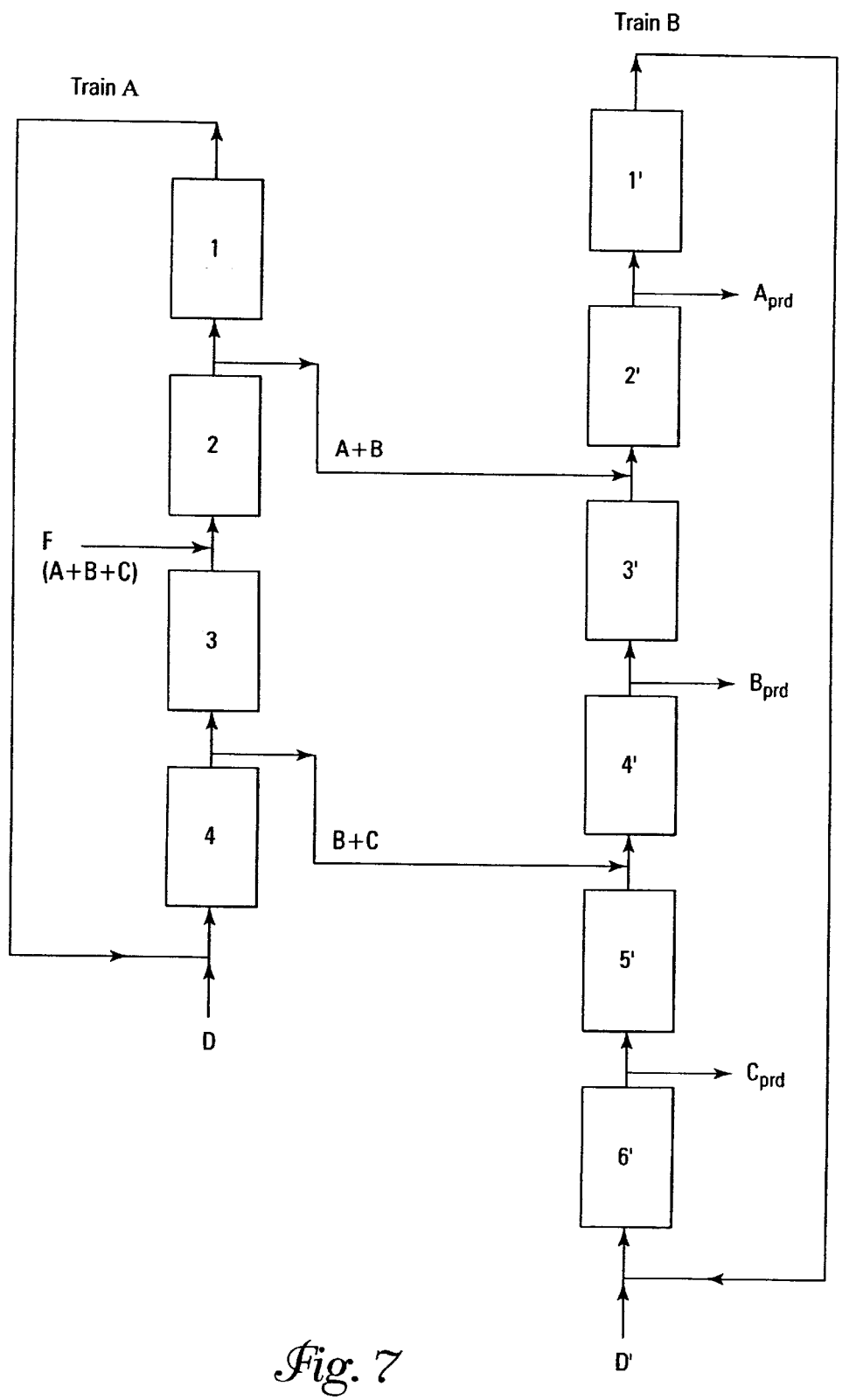
FIG. 7 illustrates an embodiment of the present invention as a schematic diagram of a ten-zone, 2-train simulated moving bed ternary separation system. Switching of ports is not shown, but should be understood to occur. F is the feed, A is the least strongly adsorbed solute, B is the middle solute, C is the most strongly adsorbed solute, and the desorbent D is water.

In another aspect, the present invention discloses a ten-zone separation system. An example of such a configuration is shown in FIG. 7. This scheme is an improvement compared to the standard ternary separation system (FIG. 2), but is inferior to the twelve-zone systems of the present invention shown in FIGS. 8 and 9 (see Table 1). The reason FIG.

7 is not as efficient as the processes shown in FIGS. 8 and 9 is that significantly more feed is sent to column 2, and hence more desorbent is required in column 2.

Figure 12:
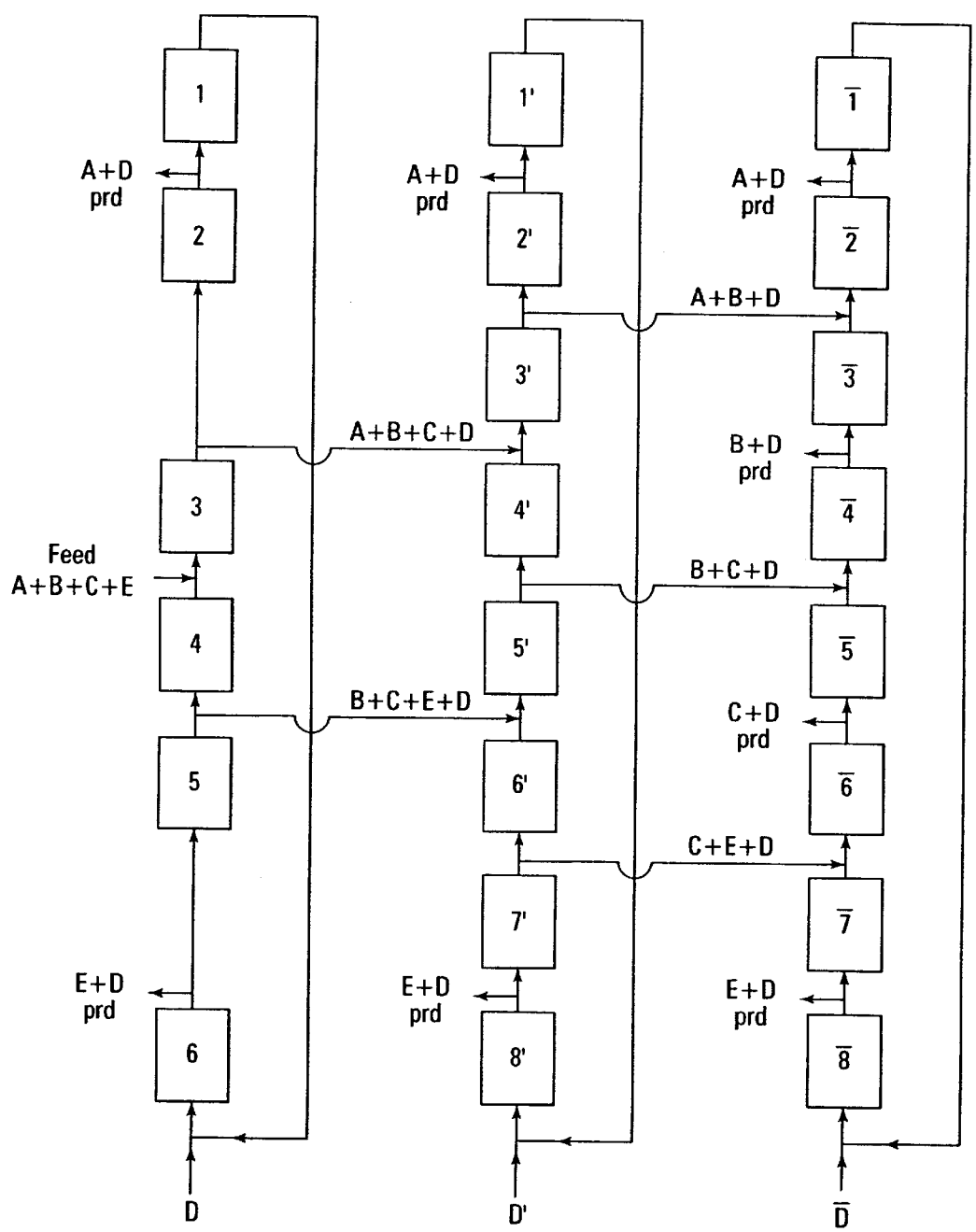
FIG. 12 illustrates an embodiment of the present invention as a schematic diagram of a twenty-two-zone simulated moving bed quaternary separation system having three trains, one with six zones and two with eight zones each. Switching of ports is not shown, but should be understood to occur. F is the feed, A is the least strongly adsorbed solute, B is the less strongly adsorbed middle solute, C is the more strongly adsorbed middle solute, E is the most strongly adsorbed solute, and D is the desorbent.

The processes in FIGS. 8 and 9 can be extended to the separation of more components by adding more columns and more trains. In general for this type of cascade where the easiest separations are always done first, if C equals the number of components to separate, the number of trains is preferably equal to C−1. The number of zones in the last two trains is preferably equal to 2C, and the number of zones in each preceding train is preferably equal to 2C−2, 2C−4, . . . 6. The total number of zones is preferably equal to 2C+2C+(2C−2)+(2C−4)+ . . . +6. For a binary component feed, this is translates to the preferable scheme of 1 train with 4 zones. For a ternary feed, this translates to the preferable scheme of 2 trains with six zones per train, for a total of 12 zones. For a quaternary feed, this translates to the preferable scheme of 3 trains (two 8-zone trains and one 6-zone train) with a total of 22 zones (FIG. 12). For a five component feed, this translates to the preferable scheme of 4 trains (two 10-zone trains, one 8-zone train, and one 6-zone train) with a total of 34 zones. Easy-split schemes can be easily derived for multi-component feeds based on the above preferred parameters.

The present invention is illustrated by the following examples. It is to be understood that the particular examples, materials, amounts, and procedures are to be interpreted broadly in accordance with the scope and spirit of the invention as set forth herein.

EXAMPLES

System and operating parameters used in the examples are listed in Table 11.

Example 1

Partial Feed Experiment

For the partial feed strategy, the operation parameters (e.g., temperatures, pressures, product flow-rates, desorbent flow-rate, switch time, etc.) were maintained at the same level as for standard operation conditions. However, the feed flow-rate and the raffinate flow-rate were varied. The feed flow-rate changed from continuous constant flow in total feed to discontinuous pulse flow in partial feed. However, the feed amount for each step was kept the same by adjusting the feed period, $t_{feed}$, and feed flow-rate in partial feed operation $$[(\text{feed flow-rate})*t_{sw}]_{total\ feed} = [(\text{feed flow-rate})*t_{feed}]_{partial\ feed}$$

where $$t_{feed} \leq t_{sw}$$

During the feed step, the raffinate flow-rate was increased to keep the flow-rate in zone 4 constant. Note that the total feed can be considered as a special case of partial feed.

If $t_{feed}=t_{sw}/n$, (n≧1), the feed flow-rate during $t_{feed}$ was n times the feed flow-rate in the total feed process. It will be shown that when the end of the feed pulse exits earlier, dispersion effects are lessened, and higher product purities and recoveries are obtained.

For the 4-zone SMB (FIG. 1 and FIG. 6), the flow-rates in zones 2, 3, and 4 were the same for both total feed and partial feed operations. The only difference was in zone 1. In the total feed operation, the solute traveled with a constant velocity throughout the switch time. Compared with that velocity, the solute velocity was higher during the feed interval and lower when there was no feed in the partial feed case. While in the total feed operation, only part of the solute exited. The remaining solute took several cycles to exit.

The feed pulse may be placed somewhere in the middle of the switch time, or the feed span may be changed. Regardless, partial feed results in less travel length and time than total feed. This result is valid for both solutes. This will decrease dispersion. Therefore, more concentrated products and higher recoveries are expected. An alternative is to operate at higher feed rate with the same purity and hence increase productivity.

Several yardsticks are defined as follows. Product purity is defined as the ratio of the desired component to the sum of all the feed components in the product. Productivity is the measure of the capacity of the operation system and is defined as the flow-rate of the feed per unit amount of absorbent. Recovery relates to the amount of desired component obtained from the feed after separation and is defined as the ratio of the amount of the desired component in the product to the amount of the same component in the feed.

Results

The fractionation behavior of dextran T6 and raffinose was simulated using a linear isotherm (Ching et al., *AICHE J.*, 38:1744–50 (1992)). Aspen Chromatography 10.1 was used to simulate the 4-zone SMB. The 3-zone SMB simulations with the dispersion model was coded with Matlab. Our purpose was to compare the differences between the total feed and the partial feed operation strategy.

4-Zone Simulations—Aspen Chromatography 10.1 A 4-zone SMB was built with Aspen Chromatography Version 10.1 and the SMB was operated in both total feed and partial feed conditions. Under both operations, the average feed flow-rate was the same. Thus, the productivities were the same. Our goal was to compare the recoveries and purities between total feed and partial feed.

Figure 15B:
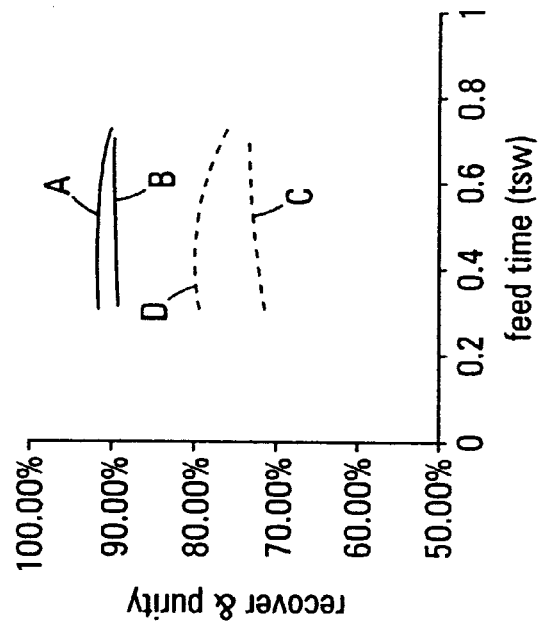
FIG. 15(b) is an illustration of the effect of varying feed time on recovery and purity of discharge streams for an embodiment of the present invention including a 4-zone SMB. Feed lengths are $0.4*t_{sw}$.
Figure 15A:
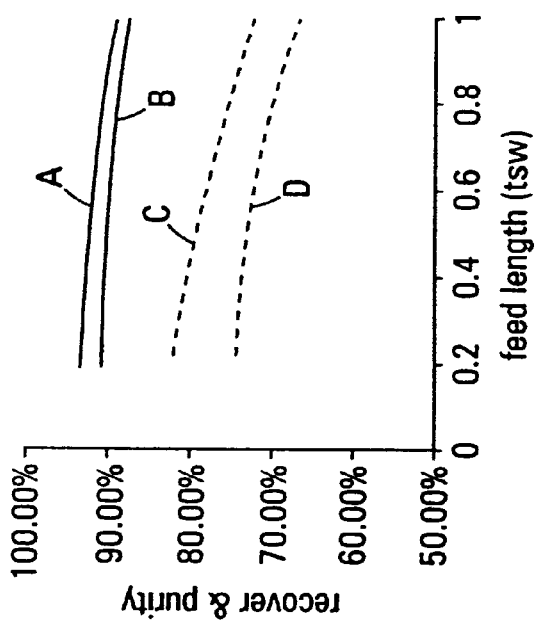
FIG. 15(a) is an illustration of the effect of varying feed length on recovery and purity of discharge streams for an embodiment of the present invention including a 4-zone SMB. Feed times are in the middle of the switch time.

Aspen Chromatography Version 10.1 gave the outlet concentrations in both raffinate and extract products after every cycle. The purity and recovery for each simulation was easily obtained. Table 9 summarizes some of the results. Based on Table 9, partial feed improved the 4-zone SMB in almost every aspect. The products were purer and higher recovery was achieved. The feed length and the feed time played important roles in partial feed operation. "Feed length" refers to the length of the time of feeding. "Feed time" refers to the time when the center of the feed pulse feed center enters the column. The shorter the feed length, the higher purity and recovery attained (FIG. 15*a*). But shortening the "feed length" increased the pressure drop in the column. This will have an effect on the extent to which feed length can be shortened. From the simulation results (FIG. 15*b*), it can be seen that early feed introduction favors raffonose recovery and raffinose purity, while late feed introduction is good for raffinose recovery and dextran T6 purity. Note that in FIG. 15*a*, separation at $t_{sw}=1.0$ is total feed, which is the prior art operating method. Clearly, partial feed results are superior.

3-Zone Simulations—Dispersion Model

Figure 4:
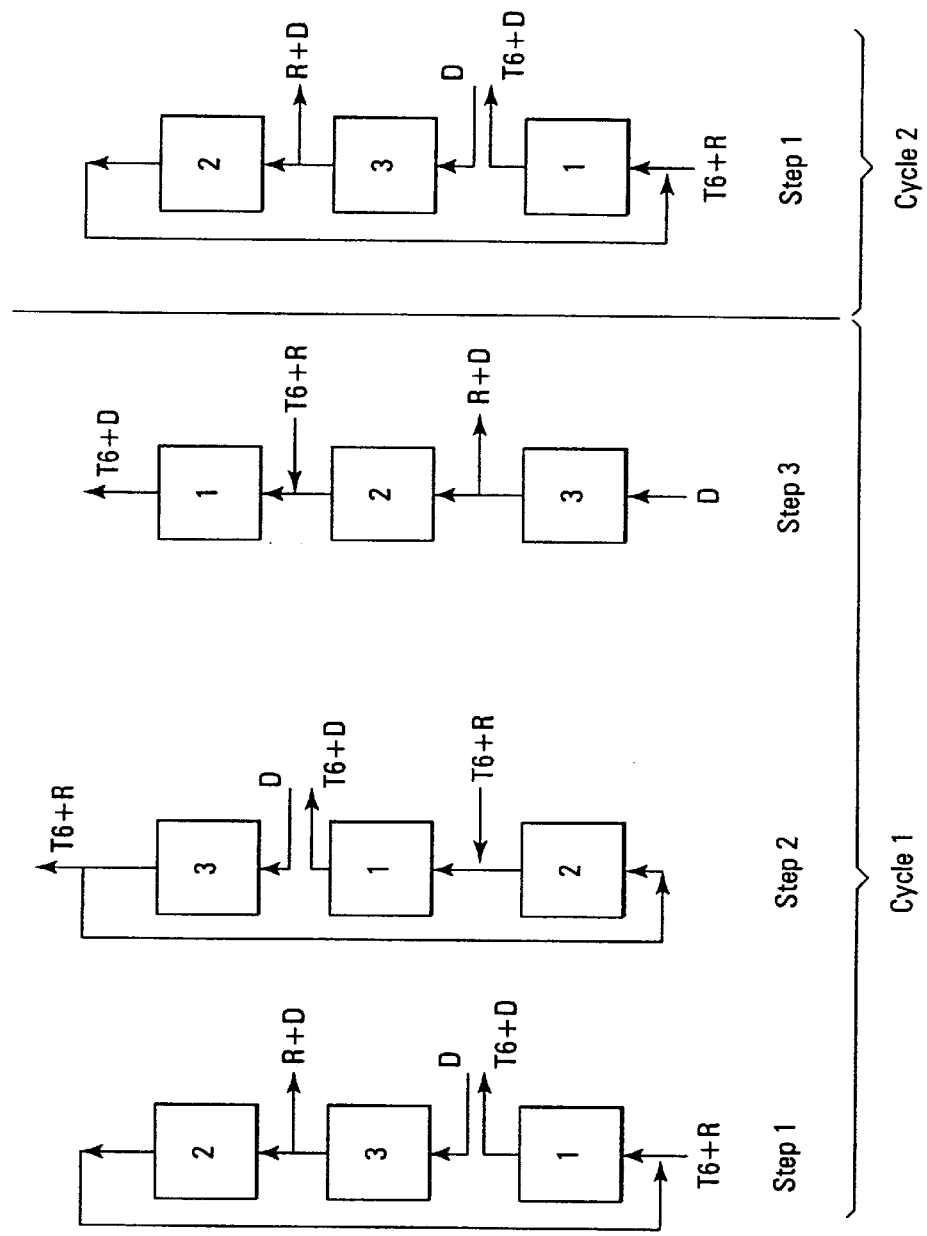
FIG. 4 is a schematic diagram of a prior art three-zone simulated moving bed total feed system. Dextran T6 (T6) is the less strongly adsorbed solute. Raffinose (R) is the more strongly adsorbed solute. The desorbent (D) is, for example, water.

3-Zone SMB. A 4-zone total feed system with one column per zone is shown in FIG. 4 (prior art). The 3-zone SMB operates without zone 4. Since there are only 3 columns, each cycle contains only 3 steps.

The partial feed embodiment of the present invention for 3-zone SMB is analogous to the 4-zone SMB partial feed case, feeding during a fraction of the switch interval at a higher flow-rate. Since Aspen Chromatography Version 10.1 cannot easily simulate the 3-zone system, a different analysis was used.

Development of Lapidus and Amundson Model. Lapidus and Amundson (*Phys. Chem.* 56, 984–88 (1952)) included axial dispersion in a single porosity mass balance. They assumed very rapid mass transfer so that solid and fluid were in equilibrium. Dunnebier et al. (*Chem. Eng. Sci.*, 53:2537–46 (1998)) applied the Lapidus and Amundson model to SMBs. A different application of the Lapidus and Amundson model was developed in the present study. The Lapidus and Amundson model with velocity change was first developed.

Case 1. The first situation occurs when the solute within one column changes its velocity due to port switching. All the solute in that column changes its velocity at the same time. In total feed operation, this happens at every switch. For example, the solute in the bottom column, which is zone 1 (FIG. 4), travels at the speed v1 during step 2. After switching, the bottom column becomes zone 2 and the solute's velocity changes to v2. While in the partial feed operation strategy, such velocity change also occurs in column 1 at the start and the end of the feed in addition to the switching of ports.

Case 2. In this case, the outlet concentration from a column when the inlet solute concentration is varying with time was studied. Inspired by the superposition method for the pulse input, the continuous input by a large number of pulse inputs was approximated. The dispersion solutions, cases 1 and 2, were applied to the 3-zone SMB model in the next section.

3-Zone SMB Computation

With the expansions deduced earlier, the steady state product concentration profiles for a 3-zone SMB can be calculated. Based on that, the purity of the products and the recoveries of each component are at hand.

The simpler case, total feed operation (FIG. 4) was chosen to illustrate the procedure. A dynamic method is chosen to approach the steady state concentration for both products. Starting from the very beginning, all three columns are clean. The concentration profiles of the raffinate and the extract were calculated unit by unit until little change was observed. The calculation unit is defined as a column serving as zone 1, 2, and 3 subsequently at the three succeeding steps. For each unit, there are three outputs for which raffinate, extract, and the outlet concentration from zone 2 could be obtained, which is required for the calculation of the next unit.

Generally, an output from a certain zone is affected by two kinds of inputs, except the output from zone 3 since there is no recycling solute from zone 1. One is the inlet flow from the bottom of the column. The other is from the solute left on the column from the previous operation, that is the initial concentration profile in the column at the beginning. Since the system is linear, the output is the sum of the outputs from the two inputs. The solute entering the column bottom is the output obtained in the previous unit calculation.

Results. Applying the expanded dispersion model to 3-zone SMB, the cyclic steady state raffinate and extract concentration profiles were found. The rafinose product exits the raffinate port and the raffinose exits the extract port. The extract flow contains raffinose for the entire switch time. The dextran T6 product is only in part of the raffinate flow. In total feed, about ⅔ of the raffinate is pure desorbent during every switch. This part of the raffinate is recycled.

Figure 13:
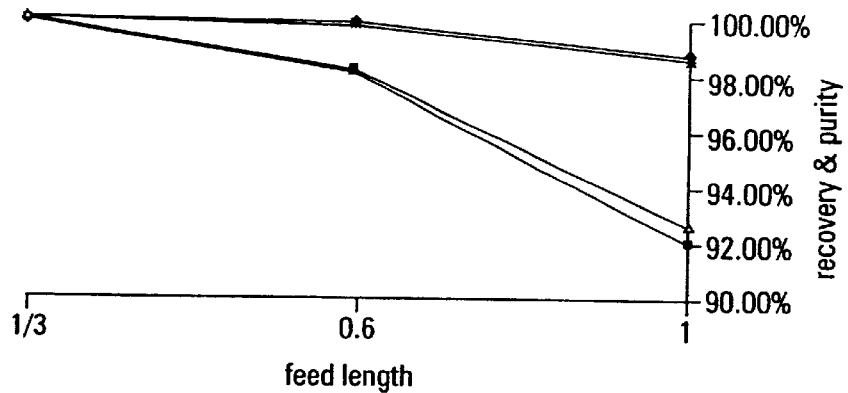
FIG. 13 is an illustration of the effect of varying feed length on recovery and purity of discharge streams for an embodiment of the present invention including a three-zone SMB. Feed times are in the middle of the switch time. Dextran T6 recovery (♦), raffinose recovery (■), dextran T6 purity (▲), and raffinose purity (X) are plotted versus feed length.

In partial feed, not only is desorbent usage more efficient, but the dextran T6 product is also purer. FIG. 13 shows one of the partial feed simulations with feed from 0.33 to 1 (1 being the prior art normal feed condition) of the switch time. It is clear that both dextran T6 and raffinose product purities increase for partial feed because the impurity tails in both products shrink or totally disappear.

Figure 14:
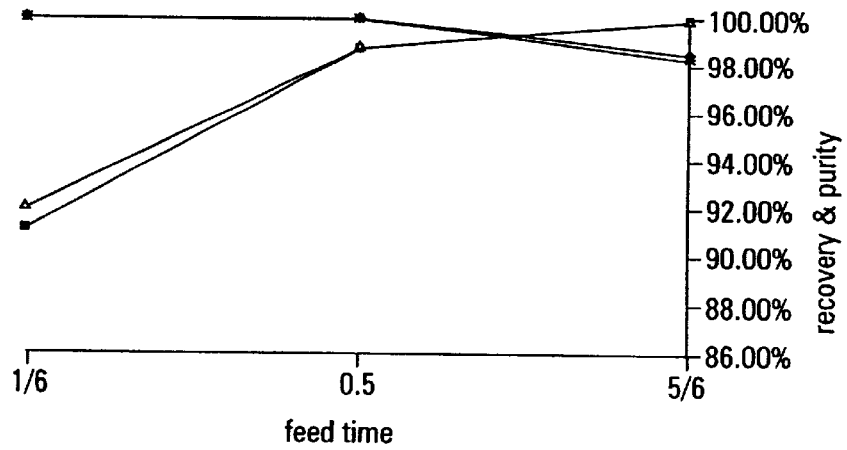
FIG. 14 is an illustration of the effect of varying feed time on recovery and purity of discharge streams for an embodiment of the present invention including a three-zone SMB. Feed lengths are the same: $t_{sw}/3$. Dextran T6 recovery (♦), raffinose recovery (■), dextran T6 purity (▲), and raffinose purity (X) are plotted versus feed time.

From the simulation results, the purities, recoveries and productivities were easily obtained. Again, the productivity was fixed to observe purity effects and recovery changes (Table 10). Again, the two operational parameters of partial feed, "feed length" (FIG. 13) and "feed time" (FIG. 14) affect the purity and the recovery with the same trend as in 4-zone SMB.

Discussion. To better understand the effect of feed time on the purity and recovery of the products, one needs to consider the effect on the period the solute spends in the columns. The earlier the feed time, the less time that dextran T6 solute from any feed pulse spends in the SMB. This reduces dextran T6 dispersion. Thus, most of the dextran T6 in the feed is recovered in the raffinate, increasing dextran T6 recovery, and less of it appears in the extract, increasing raffinose purity. But the early feed makes the raffinose solute spend a longer time in the SMB columns. Raffinose disperses more, which reduces raffinose recovery and reduces the purity of dextran T6 product. A late feed time is good for raffinose recovery and dextran T6 purity and worsens the raffinose purity and dextran T6 recovery. A compromise is to input the feed near the center of the step.

A short feed length benefits both the purity and recovery of the products, since dispersion of both solutes is reduced. However, the increased pressure drop will limit how short the feed period can be.

The results for the two models, 4-zone SMB built with Aspen Chromatography Version 10.1 and 3-zone SMB simulation based on Lapidus and Amundson dispersion model, both seem to be self-consistent, but do not agree with each other. Although the same dispersion and mass transfer parameters were used in both models, the Aspen Chromatography Version 10.1 simulations show considerably more spreading than the Lapidus and Amundson model predictions. This difference is clearest in the predicted recoveries between the two models. The 4-zone SMB does recycle a stream that may not be totally pure and this will increase spreading compared to the 3-zone system. The productivity difference is real since there is 25% less adsorbent in the 3-zone system.

The partial feed for the 4-zone SMB with 2 columns per zone was also tested with Aspen Chromatography Version 10.1. The partial feed is better than the total feed operation, although the improvement is not as much as the 4-zone SMB with 1 column per zone.

The Matlab program for the dispersion model is coded for linear isotherm, two component separations in a 3-zone SMB. To check whether it is correct, calculations were carried out to determine whether the mass balances were satisfied. By increasing the accuracy and the number of segments in the programs, the error is within the satisfactory range.

Example 2

Separation System Designs

Local equilibrium solutions were first developed to compare designs and to find the regions where each design excels. A detailed simulator (Aspen Chromatography Version 10.1) was used to include zone broadening effects for the separation of a real system.

Local Equilibrium solution. The local equilibrium solution is easily developed for all of the schemes shown in FIGS. 2, 7, 8, 10, and 11 for systems with linear isotherms. $(D/F)_{min}$ is the ratio of the desorbent flow rate divided by the feed flow rate under conditions that minimize the ratio. Our purpose was to find the conditions that minimized desorbent usage and then compare the values of $(D/F)_{min}$ and the productivity for each cascade. This was done for the separation of different ternary mixtures.

The local equilibrium (or solute movement theory) is well known. It was first applied to four zone SMB systems by Wankat (P. C. Wankat, *Proceedings, Corn Refiner's Assoc.* (Washington, D.C.) 1982 *Scientific Conference* (Lincolnshire, Ill.), 119–67, Jun. 16–18, 1982) and has been used in a number of guises since that time. This model assumes very rapid mass transfer and negligible dispersion so that the adsorbed solute is always in equilibrium with the solute in solution outside the adsorbent particles. For linear isotherms the solute velocity is described in P. C. Wankat, *Rate-Controlled Separations*, Chapter 6, Kluwer Publishing Co., Amsterdam (1990).

The total amount of desorbent is $$D_{total} = D_{trainA} + D_{trainB}$$

which allows $D_{total}/F$ to be calculated. The productivity of the system is defined as Productivity=(volume feed/time)/total adsorbent volume or, Productivity=$F/([$(No. of columns)$A_c L]_{trainA}+[$(No. of columns)$A_c L]_{trainB})$ where $A_c$ is the cross sectional area of the column and L is the column length. The port velocity, $u_{port}$, is defined by the equation $$L = (u_{port})(t_{sw})$$

For the local equilibrium solution the switching time (or column length) can be arbitrarily specified. To make the productivities comparable for all systems, a constant switching time of 7.5 minutes was arbitrarily chosen. This choice does not affect the calculated values of D/F.

Results of Local Equilibrium Calculations. Which cascade has the lowest D/F ratio and the highest productivity was determined. By programming the previous calculations in a spreadsheet, the calculations can easily be made for a variety of separations. The difficulty of linear separations can be classified based on the selectivity, $\alpha$, $$\alpha_{ik} = K_k/K_i \geq 1.0,$$

where $K_i$ is the linear equilibrium constant
A separation with $\alpha=1.1$ was considered hard, an $\alpha=1.5$ was moderate, and an $\alpha=4.0$ was easy. The value of $K_A$ was arbitrarily chosen as 0.2. Nine cases were then examined where both the A–B and the B–C separations could be hard, moderate or easy. The corresponding values of the K values and the solute velocities are given in Table 2. The last column in Table 2 lists the values $\alpha'$ $$\alpha_{ik}' = u_i/u_k \geq 1.0$$

TABLE 2

Conditions for Local - Equilibrium Calculations

| $\epsilon_c = 0.40$ | $\epsilon_p = 0.45$ | $K_d = 1.0$ |
|---|---|---|
| $K_A = 0.20$ | $U_A = 0.5435v$ | |
| Hard $\alpha = 1.10$, | Moderate $\alpha = 1.50$ | Easy $\alpha = 4.00$ |
| 1st Hard, $\alpha_{BA} = 1.10$, $K_B = 0.220$, | $u_B = 0.5387v$, | $\alpha_{AB} = 1.009$ |
| 2nd Hard $K_C = 0.242$ | $u_C = 0.5334v$, | $\alpha_{BC} = 1.010$ |
| Mod $K_C = 0.330$ | $u_C = 0.5135v$, | $\alpha_{BC} = 1.049$ |
| Easy $K_C = 0.880$ | $u_C = 0.4165v$, | $\alpha_{BC} = 1.293$ |
| 1st Moderate, $\alpha_{BA} = 1.50$, $K_B = 0.300$ | $u_B = 0.5202_v$, | $\alpha_{AB} = 1.045$ |
| 2nd Hard $K_C = 0.330$ | $u_C = 0.5135v$, | $\alpha_{BC} = 1.013$ |
| Mod $K_C = 0.450$ | $u_C = 0.4887v$, | $\alpha_{BC} = 1.064$ |
| Easy $K_C = 1.20$ | $u_C = 0.3752v$, | $\alpha_{BC} = 1.386$ |
| 1st East, $\alpha_{BA} = 4.0$, $K_B = 0.800$ | $u_B = 0.4283v$, | $\alpha_{AB} = 1.269$ |
| 2nd Hard $K_C = 0.880$ | $u_C = 0.4165v$, | $\alpha_{BC} = 1.028$ |
| Mod $K_C = 1.20$ | $u_C = 0.3752v$, | $\alpha_{BC} = 1.141$ |
| Easy $K_C = 3.20$ | $u_C = 0.2318v$, | $\alpha_{BC} = 1.848$ |
| Constant $\alpha$ Easy—Easy with $\alpha_{AB} = \alpha_{BC} = 1.848$ | | |
| $K_B = 2.091$, $u_B = 0.2941v$; | $K_C = 5.586$, | $u_C = 0.1591v$ |

Note in Table 2 that $\alpha'$ varies for a second separation of the same degree of difficulty depending upon the difficulty of the first separation. For example, compare $\alpha'_{BC}$ for Hard-Easy and Easy-Easy separations. This difference becomes important in interpreting the results later. The last entry in Table 2 looks at a separation where the two values of $\alpha'$ are constant.

The switching time was chosen to be constant at $t_{sw}=7.5$ minutes. Column diameters were sized so that the maximum velocity in each train was 100 cm/min. These values are arbitrary, but ensure that the productivities of equivalent cascades are compared.

The calculated values of the desorbent to feed ratio (D/F) and the productivity for the local equilibrium analysis of the ternary SMB systems are given in Table 3. D/F includes the most important operating cost, desorbent usage. D/F may also be important for capital costs if solvent removal from the products requires distillation columns. The productivity includes an important capital cost, the amount of adsorbent required. Minimizing D/F and maximizing productivity will tend to minimize the cost of the SMB system.

TABLE 3

Results of Local Equilibrium Solutions

Figure 10:
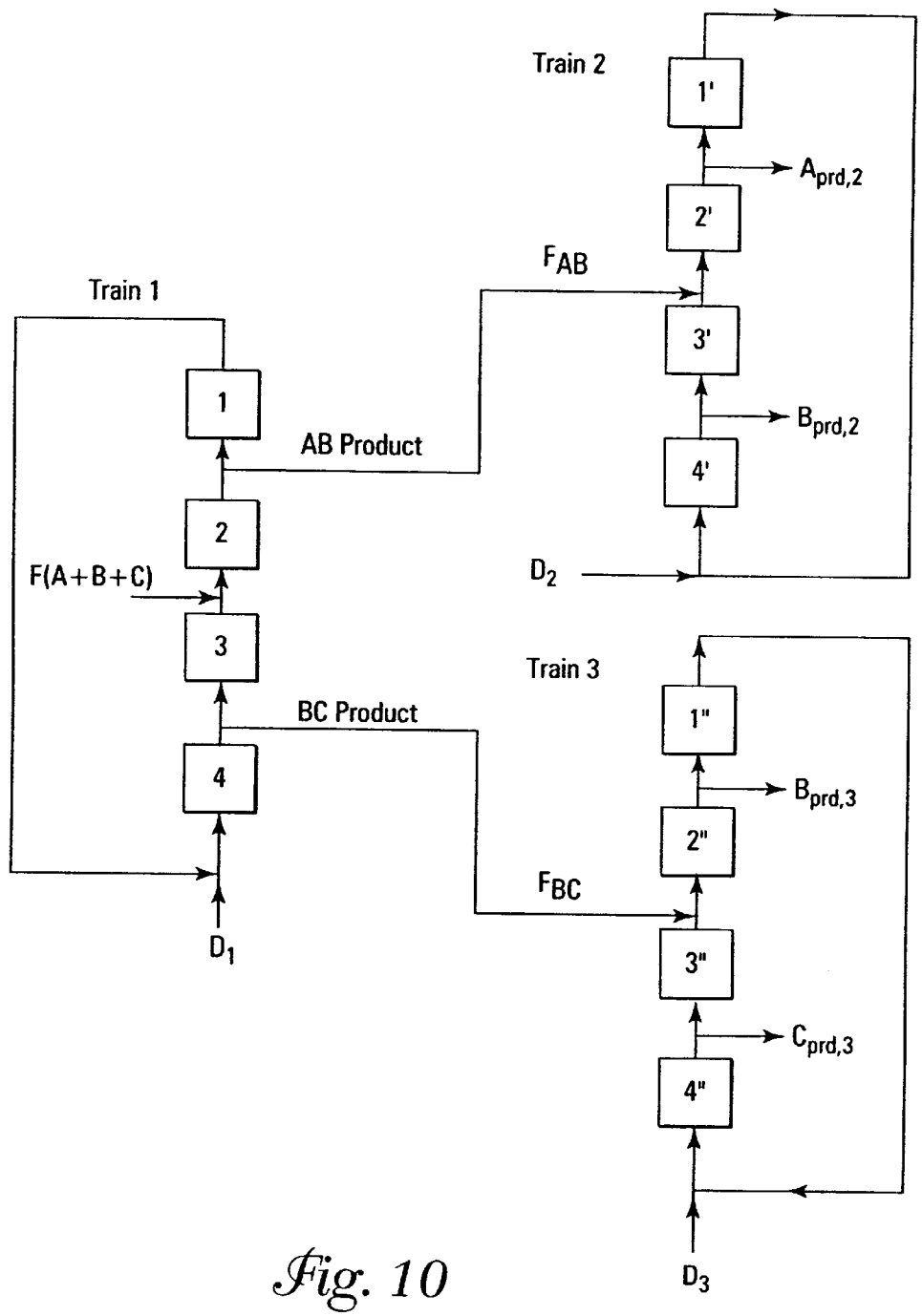
FIG. 10 illustrates an embodiment of the present invention as a schematic diagram of a twelve-zone simulated moving bed ternary separation system having three trains with each train having four zones. Switching of ports is not shown, but should be understood to occur. F is the feed, A is the least strongly adsorbed solute, B is the middle solute, C is the most strongly adsorbed solute, and D is the desorbent.
Figure 11:
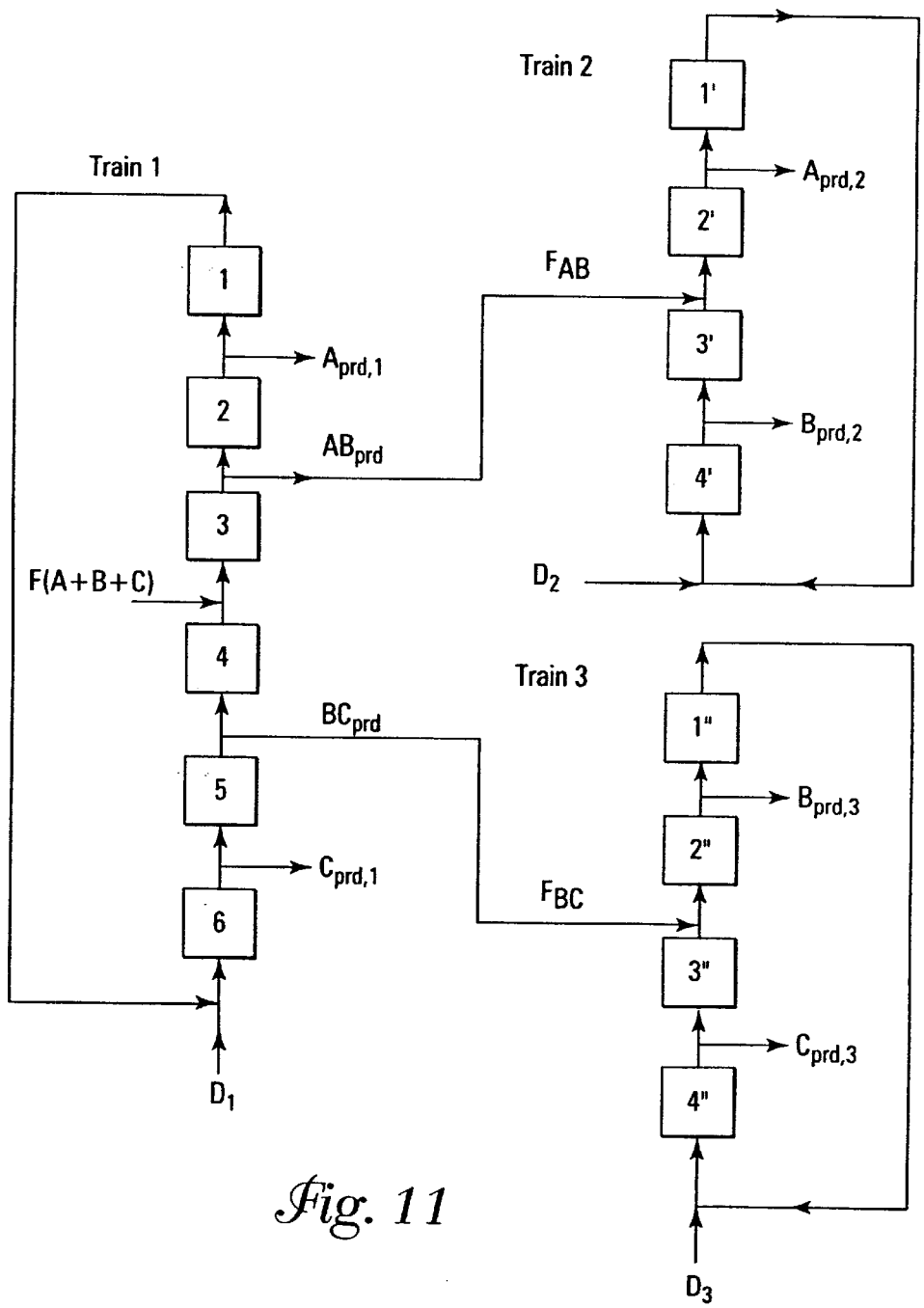
FIG. 11 illustrates an embodiment of the present invention as a schematic diagram of a fourteen-zone simulated moving bed ternary separation system having three trains, one with six zones and two with four zones each. Switching of ports is not shown, but should be understood to occur. F is the feed, A is the least strongly adsorbed solute, B is the middle solute, C is the most strongly adsorbed solute, and D is the desorbent.

| | Cascade | | | | | |
|---|---|---|---|---|---|---|
| Separation | 8 Zone A + B to 2nd FIG. 2a | 8 Zone B + C to 2nd FIG. 2b | 10 Zone easy-split FIG. 7 | 12 Zone easy-split FIG. 8 | 4.4.4 easy-split FIG. 10 | 14 Zone easy-split FIG. 11 |
| Hard–Hard, D/F | 3.82 7.82 E−5** | 4.19 7.59 E−5 | 3.10* 1.12 E−4* | 2.10* 1.47 E−4 | 3.00 9.25 E−5 | 2.00 1.32 E−4 |
| Productivity, min$^{-1}$ | | | | | | |
| Hard–Mod, | 2.37 | 12.96 | 7.48* | 6.48* | 3.00 | 2.00 |

TABLE 3-continued

Results of Local Equilibrium Solutions

Cascade

| Separation | 8 Zone A + B to 2nd FIG. 2a | 8 Zone B + C to 2nd FIG. 2b | 10 Zone easy-split FIG. 7 | 12 Zone easy-split FIG. 8 | 4.4.4 easy-split FIG. 10 | 14 Zone easy-split FIG. 11 |
|---|---|---|---|---|---|---|
| D/F | 1.62 E−4 | 1.01 E−4 | 1.34 E−4* | 1.47 E−4* | 1.65 E−4 | 2.00 E−4 |
| Productivity, min$^{-1}$ | | | | | | |
| Hard–Easy, | 2.06 | 67.74 | 34.88* | 33.90* | 3.00 | 2.00 |
| D/F | 2.08 E−4 | 1.09 E−4 | 1.44 E−4* | 1.47 E−4* | 2.08 E−4 | 2.17 E−4 |
| Productivity, min$^{-1}$ | | | | | | |
| Mod–Hard, | 8.67 | 2.60 | 5.34* | 4.34* | 3.00 | 2.00 |
| D/F | 1.44 E−4 | 2.06 E−4 | 1.91 E−4* | 2.20 E−4* | 2.16 E−4 | 2.79 E−4 |
| Productivity, min$^{-1}$ | | | | | | |
| Mod–Mod, | 3.33 | 5.00 | 3.50* | 2.50* | 3.00 | 2.00 |
| D/F | 4.72 E−4 | 4.13 E−4 | 5.79 E−4* | 7.34 E−4* | 5.33 E−4 | 7.50 E−4 |
| Productivity, min$^{-1}$ | | | | | | |
| Mod–Easy, | 2.22 | 20.02 | 11.01* | 10.02* | 3.00 | 2.00 |
| D/F | 9.01 E−4 | 5.22 E−4 | 6.88 E−4* | 7.33 E−4* | 9.09 E−4 | 1.04 E−3 |
| Productivity, min$^{-1}$ | | | | | | |
| Easy–Hard, | 17.00 | 2.27 | 9.50* | 8.50* | 3.00 | 2.00 |
| D/F | 4.13 E−4 | 6.95 E−4 | 5.44 E−4* | 5.87 E−4* | 7.04 E−4 | 8.19 E−4 |
| Productivity, min$^{-1}$ | | | | | | |
| Easy–Mod, | 5.00 | 3.34 | 3.50* | 2.50* | 3.00 | 2.00 |
| D/F | 1.65 E−3 | 1.89 E−3 | 2.32 E−3* | 2.94 E−3* | 2.13 E−3 | 3.00 E−3 |
| Productivity, min$^{-1}$ | | | | | | |
| Easy–Easy, | 2.50 | 10.00 | 6.00* | 5.00* | 3.00 | 2.00 |
| D/F | 4.40 E−3 | 2.93 E−3 | 2.32 E−3* | 4.40 E−3* | 4.55 E−3 | 5.74 E−3 |
| Productivity, min$^{-1}$ | | | | | | |
| Constant ά | 3.08 | 5.70 | 3.85* | 2.85* | 3.00 | 2.00 |
| Easy–Easy, | | | | | | |
| D/F | 9.99 E−3 | 8.19 E−3 | 1.12 E−2* | 1.39 E−2* | 1.10 E−2 | 1.52 E−2 |
| Productivity, Min$^{-1}$ | | | | | | |

*System is over constrained. Lower values may be possible.
**7.82 E−5 is shorthand for 7.82 × 10$^{-5}$ There are general trends in Table 3. The 14-zone easy-split system shown in FIG. 11 always has the lowest D/F, equal to 2.00 for all eases. Except for the hard-hard case, this system also has the highest productivity. However, the 14-zone system is also the most complicated, and there may be reasons to select simpler systems. The next preferred but simpler system follows a more complicated trend. In general, when the A–B separation is more difficult than the B–C separation, FIG. 2a is the next preferred system. When the B–C separation is more difficult than the A–B separation, FIG. 2b is next preferred. When the two separations are of approximately equal difficulty, the twelve zone easy-split system (FIG. 8) is next preferred.

One exception to the trends for the next preferred system appears to be the easy-easy separation. FIG. 2a clearly has a lower D/F than FIG. 8. However, the α' values listed in Table 2 show that α'$_{BC}$>α'$_{AB}$. The A–B separation is really more difficult than the BC separation. If one looks at the last row in Tables 2 and 3 where the α' values are equal for an easy-easy separation, the easy-split separation (FIG. 8) is clearly preferable to FIG. 2a.

The 14-zone easy-split system (FIG. 11) has the minimum D/F ratio and high productivities because the configuration does not require extra desorbent and each of the three trains can be optimized. The optimized system operates with D/F=2, which requires F$_{AB}$+F$_{BC}$=F. The results in Table 4 show that for separations between A–B and B–C of equal difficulty (hard-hard, mod-mod, easy-easy), F$_{AB}$~F$_{BC}$ and the designs for trains 2 and 3 will be similar. For separations of different difficulty, most of the A or C product will be withdrawn from train 1, and the ratio F$_{AB}$/F will be considerably different than 0.5. Then the feed rates to trains 2 and 3 are very different, and the columns in these trains have very different diameters. For example, for the hard-easy separation, train 3 receives very little feed since the first train is able to recover most of the C product. Changes in the column diameter in the trains tends to affect the productivities reported in Table 3 more than changes in column length. The dimensions of the first train are symmetric in the sense that, for example, hard-easy and easy-hard separations have the same dimensions. Table 2 shows that K$_A$ and K$_C$ have the same values for these separations, and these two K values control the separation in train 1. Train 3 is also symmetric (equal lengths) but the diameters are different because the feed F$_{BC}$ varies. For train 2 all of the hard (or moderate or easy) separations are the same and thus the columns have identical lengths. The diameters differ because the feed rates, F$_{AB}$, vary.

TABLE 4

Dimensions for optimized (minimum desorbent) 14-zone easy-split SMB System (FIG. 11). $U_{port} = L/t_{sw} = L/7.5$

| | Dimensions | | | | | | |
|---|---|---|---|---|---|---|---|
| | Column diameters, cm $F_{AB}/F$ | | | Column Lengths, cm | | | |
| Seperations | train 1 | train 2 | train 3 | train 1 | train 2 | train 3 | |
| Hard–hard | 10.15 | 10.6 | 9.70 | 400.1 | 404.0 | 400.1 | 0.523 |
| Hard–mod | 5.89 | 13.45 | 2.51 | 385.2 | 404.0 | 385.2 | 0.846 |
| Hard–easy | 2.86 | 14.41 | 0.50 | 312.4 | 404.0 | 312.4 | 0.970 |
| Mod–hard | 5.89 | 3.20 | 10.75 | 385.2 | 390.1 | 385.2 | 0.231 |
| Mod–mod | 4.35 | 5.16 | 3.56 | 366.5 | 390.1 | 366.5 | 0.600 |
| Mod–easy | 2.48 | 6.33 | 0.83 | 281.3 | 390.1 | 281.2 | 0.900 |
| Easy–hard | 2.86 | 1.03 | 7.83 | 312.4 | 321.2 | 312.4 | 0.118 |
| Easy–mod | 2.48 | 1.90 | 3.04 | 281.4 | 321.2 | 281.4 | 0.400 |
| Easy–easy | 1.83 | 2.68 | 0.91 | 173.8 | 321.2 | 173.8 | 0.800 |
| Const. α, Easy–easy | 1.64 | 1.64 | 1.21 | 119.3 | 220.6 | 119.3 | 0.649 |

The dimensions of the columns in Table 4 can be varied by changing the arbitrary choice of maximum velocity in each train. If the maximum velocity is reduced, the columns become shorter and fatter. The productivities and D/F ratios are unchanged.

Productivity and D/F ratio do not encapsulate the complete cost of an SMB system. As extra zones are added and each column needs to be different dimensions the equipment is likely to become more expensive and the operation more complex. Thus, when the D/F ratios and productivities are similar, the simpler design may be preferable to the 14 zone system shown in FIG. 11. For example, FIG. 2a may be preferable for the Hard-Easy separation, and FIG. 8 may be preferable for the Hard-Hard separation.

Rules of Thumb. Based on the results the previous section, the following tentative rules of thumb have been generated for selection of SMB systems for the ternary separation of components A, B, and C where A is the weakest sorbed and C is the strongest.

1. Always consider the 14-zone easy-split SMB as one option.
2. The second option depends upon the separations. If,
   a. The A–B separation is considerably more difficult than the B–C separation, also consider the base case with A+B fed to the second train (FIG. 2a).
   b. The A–B and B–C separations are approximately of equal difficulty, also consider the 12 zone easy-split SMB (FIG. 8).
   c. The B–C separation is considerably more difficult than the A–B separation, also consider the base case with B+C feed to the second train (FIG. 2b).

The rules of thumb are tentative because they are based on an analysis of linear systems.

Detailed Simulations. More detailed simulations were done using the commercially available chromatography/dilute SMB software Aspen Chromatography Version 10.1. The separation of sulfuric acid, glucose and acetic acid in water using an ion exchange resin was modeled. Equilibrium data are given in R. Wooley et al., *Ind. Engr. Chem. Res.*, 37:3699–3709 (1998). The compounds are sterically excluded from a portion of the resin. Since sulfuric acid does not sorb and is excluded from a significant fraction of the resin, it travels at a velocity greater than the superficial velocity of the fluid. Unfortunately, Aspen Chromatography Version 10.1 does not include steric exclusion. In order to use this software for the simulation, the values were translated to a system without steric exclusion that is equivalent in the sense that the solute velocities are the same. To do this the solute velocities were calculated according to R. Wooley et al., *Ind. Engr. Chem. Res.*, 37:3699–3709 (1998). Solving for $K_i$, values gave the following: $K_{sulfuric}=1.3118$, $K_{glucose}=3.3118$, and $K_{acetic}=5.2637$.

Since the equivalent system has a different porosity structure, the mass transfer data obtained by R. Wooley et al., *Ind. Engr. Chem. Res.*, 37:3699–3709 (1998) could not be used. For linear systems zone spreading due to dispersion and mass transfer effects can be modeled with an equivalent dispersion determined from a plate count (e.g., P. C. Wankat, *Rate-Controlled Separations,* Chapter 6 and 7, Kluwer Publishing Co., Amsterdam (1990)). The plate count was arbitrarily set at 150 plates in each column. The results for the different ternary SMB systems are comparable, but do not correspond exactly to the real system. For more detailed modeling see R. Wooley et al., *Ind. Engr. Chem. Res.*, 37:3699–3709 (1998).

The SMB systems were simulated with two columns per zone. A common switching time of 7.93 minutes was used so that productivities are directly comparable. Feed rate was 60 ml/min. The feed contained 0.5 g/l of each solute. A column diameter of 3.37 cm was used for the standard feed rate and was increased if necessary for higher feed rates in subsequent columns. Changing the column diameter changes the flow rates, but has little effect on the productivities in this set of simulations. All of the SMB systems were first designed to find minimum D/F values using local equilibrium theory. The resulting flow rates and column lengths were then used as the input for Aspen Chromatography Version 10.1.

Aspen Chromatography Version 10.1 was coded to do a single complex SMB. The SMB train receiving the fresh feed was simulated first. The intermediate feed streams (e.g., $F_{BC}$ in FIG. 2b) were treated as if they were sent to a holding tank and were well-mixed. The concentrations of these feeds were obtained as the average concentrations of the intermediate products from the first train. At the minimum desorbent rate the predicted outlet concentrations of all the trains showed an oscillation between two cyclic steady state results. These changes did not appear to have a major impact on the results reported below. When desorbent rates greater than the minimum were used, a single, stable cyclic steady state was obtained for each SMB train.

The simulation results at minimum D/F for the better of the two prior art cases (FIG. 2a) the 12-zone system (FIG. 8), and the 14-zone (FIG. 11) are shown in Tables 5, 6, and 7, respectively. Since the separation obtained for the 10-zone system was not as good as for the 12-zone system and D/F was higher, these results are not shown. Comparison of the tables shows that the new SMB systems (embodied in this invention) are clearly preferable to the prior art case. The D/F ratio is only slightly better in the 14-zone SMB compared to the 12-zone SMB while the productivity is better in the 12-zone system. Since train 1 is identical in these two systems, the product concentrations obtained for train 1 are identical. Comparing the purity of the other products (train 2 in the 12-zone or trains 2 and 3 in the 14-zone) shows that the 12-zone system has higher purities. Thus for this separation of acetic acid, glucose, and sulfuric acid the 12-zone system (FIG. 8) is preferable. This result agrees with the rules of thumb since the sulfuric acid-glucose and the glucose-acetic acid separations are of approximately equal difficulty.

The 12-zone easy-split SMB (FIG. 8) was simulated with higher desorbent rates in longer columns in an attempt to improve the product purities. The results for one run with a modest increase in desorbent rate is shown in Table 8. At the cost of more desorbent and decreased productivity the product purities are all increased. By increasing the desorbent rate further (D/F=4.29) the purities of all products can be increased to greater than 99%. The productivity does drop further to 0.17 (1 feed/h/1 column). These values for D/F ratio and productivity are similar to those reported for the prior art case (Table 5), but the 12-zone easy-split system has much improved purities.

TABLE 5

Aspen Chromatography Version 10.1 simulation of sulfuric acid, glucose, acetic acid separation using 8-zone pror art SMB (FIG. 2a) at ideal minimum desorbent flow rates. 2 columns/zone, $t_{sw}$ = 7.93 min, F = 60 ml/min

| Train 1 | $d_{col}$ = 3.37 cm | L = 102.62 cm | | |
|---|---|---|---|---|
| APROD: | 1.41% acetic | 2.24% glucose | 96.35% sulfuric | 60 ml/min |
| BC feed: | 49.13% | 48.76% | 2.11% | 118.58 |
| Train 2 | $d_{col}$ = 4.74 cm | L = 105.0 cm | | |
| BPROD: | 7.33% acetic | 89.91% glucose | 2.76% sulfuric | 118.58 ml/min |
| CPROD: | 92.59% | 5.96% | 1.45% | 118.58 |

$$\text{Desorbent/Feed} = 3.95, \text{Feed Productivity} = 0.16 \frac{\text{liters feed/hr}}{\text{liters column}}$$

TABLE 6

Aspen Chromatography Version 10.1 simulation of sulfuric acid, glucose, acetic acid separation using 12-zone easy-split SMB (FIG. 8) at ideal minimum desorbent flow rates. 2 columns/zone, $t_{sw}$ = 7.93 min. F = 60 ml/min.

| Train 1 | $d_{col}$ = 3.37cm | L = 51.92 cm | D = 60.00 ml/min | |
|---|---|---|---|---|
| APROD: | 2.56% acetic | 2.08% glucose | 95.36% sulfuric | 30.36 ml/min |
| AB Feed | 2.74% | 47.80% | 49.47% | 29.64 |
| BC Feed | 48.98% | 49.23% | 1.79% | 30.36 |
| CPROD | 95.13% | 4.07% | 0.80% | 29.64 |
| Train 2 | $d_{col}$ = 3.37cm | L = 53.18 cm | D = 62.92 ml/min | |
| APROD: | 0.70% acetic | 2.08% | 97.22% | 31.09 ml/min |
| BPROD: | 3.95% | 93.07% | 2.99% | 61.45 |
| CPROD | 96.02% | 3.51% | 0.47% | 30.36 |

$$\text{Desorbent/Feed} = 2.00, \text{Feed Productivity} = 0.28 \frac{\text{liters feed/hour}}{\text{liters column}}$$

TABLE 7

Aspen Chromatography Version 10.1 simulation of sulfuric acid, glucose, acetic acid separation using 14-zone easy-split SMB (FIG. 11) at ideal minimum desorbent flow rates. 2 columns/zone, $t_{sw}$ = 7.93 min. F = 60 ml/min.

| Train 1 | | | | |
|---|---|---|---|---|
| See as Train 1, Table 6 | | | | |
| Train 2 | $d_{col}$ = 3.37 cm | L = 51.92 cm | | |
| APROD: | 1.77% acetic | 5.50% glucose | 92.73% sulfuric | 29.64 ml/min |
| BPROD: | 3.73% | 92.07% | 4.20% | 29.64 |
| Train 3 | $d_{col}$ = 3.37 cm | L = 51.92 cm | | |
| BPROD: | 6.60% acetic | 91.05% glucose | 2.35% sulfuric | 30.36 ml/min |
| CPROD: | 93.04% | 5.72% | 1.24% | 30.36 |

$$\text{Desorbent/Feed} = 2.00, \text{Feed Productivity} = 0.28 \frac{\text{liters feed/hour}}{\text{liters column}}$$

TABLE 8

Aspen Chromatography Version 10.1 simulation of sulfuric acid, glucose, acetic acid separation using 12-zone easy-split SMB (FIG. 8) with increased desorbent flow rates. 2 columns/zone, $t_{sw}$ = 7.93 min, $d_{col}$ = 3.37cm, F = 60 ml/min.

| Train A | L = 55.99 cm | D = 70.44 ml/min | Recycle = 66.77 ml/min | |
|---|---|---|---|---|
| APROD: | 0.50% acetic | 0.62% glucose | 98.88% sulfuric | 32.08 ml/min |
| AB | 0.72% | 48.05% | 51.23% | 31.32 |
| BC | 50.32% | 49.27% | 0.41% | 33.72 |
| CPROD | 98.91% | 0.84% | 0.25% | 32.92 |

| Train B | L = 71.83 cm | D = 89.86 ml/min | Recycle = 85.61 ml/min | |
|---|---|---|---|---|
| APROD: | 0.48% acetic | 0.03% glucose | 99.49% sulfuric | 35.69 ml/min |
| BPROD: | 1.52% | 97.56% | 0.92% | 76.98 |
| CPROD: | 93.93% | 0.81% | 0.26% | 42.24 |

Total Desorbent/Feed = 2.67, Feed Productivity = $0.26 \frac{\text{liters feed/hour}}{\text{liters column}}$

Example 3

Comparison of Processes

Proper comparison of very different processes is difficult since the economics of each individual separation are different. In some cases operating costs are most important while in others capital costs dominate. In addition, each process should be optimized for the specific separation. Unfortunately, for newly developed processes the information needed to do this type of comparison is seldom available.

To avoid these difficulties, the processes will be compared under ideal conditions looking specifically for the configuration that will minimize the ratio of desorbent rate to feed rate, D/F. The mass transfer rate will be assumed to be infinitely fast and dispersion will be assumed to be negligible. These conditions allow one to model all of these processes using well known local equilibrium theory (e.g., P. C. Wankat, *Rate-Controlled Separations,* Chapter 6, Kluwer Publishing Co., Amsterdam (1990)), which was used earlier to develop Tables 3 and 4. All of the processes were modeled for the separation of sulfuric acid (A), glucose (B), and acetic acid (C) on ion exchange resin with water as the desorbent. The data obtained by R Wooley et al. (R. Wooley et al., *Ind. Engr. Chem. Res.,* 37:3699–3709 (1998)) was used. This system's linear isotherms significantly reduce the mathematical complexity.

The approach was similar for all of the processes in FIGS. 1, 2, 3, 7, 8, 9, and 13. Since the local equilibrium model is too simple to determine the optimum switching time, a switching time of 7.5 minutes was arbitrarily chosen to make the productivities calculated for the different processes comparable. Productivity was calculated as the volume of feed processed per minute per volume of absorbent.

The results are presented in Table 1. For comparison purposes the D/F ratios and productivities are presented for both binary and ternary systems. Since no energy is being added to the systems, the minimum D/F ratio for a binary separation based on thermodynamics is 1.0. This means the solutes are recovered in pure form at the same concentration as in the feed solution. The binary SMB separating A from B or B from C can operate at this minimum under ideal conditions. However, if the binary split is done between components A and B in the presence of component C (e.g., the first column in FIG. 2), the minimum D/F is close to 2. This is also the approximate minimum D/F ratio if the split is between B and C in the presence of component A. If the separation is done by methods of the present invention (A from C) in the presence of component B, the minimum D/F=1.0 and the highest productivity is achieved.

Based on thermodynamic considerations with no energy added to the system, the minimum D/F ratio is 2.0 for a complete ternary separation. Under ideal conditions, the 12-zone SMB (FIGS. 8 and 9) is very close to this minimum D/F ratio, and the 14-zone SMB (FIG. 11) is at the minimum D/F. For the complete ternary separation the prior art systems (FIG. 2(*b*)) has the highest D/F ratio and the lowest productivity, the 14-zone SMB system (FIG. 11) has the lowest D/F ratio, and the 12-zone SMB system (FIG. 8) has the highest productivity. The systems in FIG. 3 (R. Wooley et al., *Ind. Engr. Chem. Res.,* 37:3699–3709 (1998)) and FIG. 7 have productivities and D/F ratios somewhere between the highest and lowest values found for the above described systems.

These results need to be interpreted cautiously since they are based on an ideal separation at minimum desorbent flow rates while real separations have finite mass transfer rates and finite dispersion effects. However, with this caveat, the results in Table 1 can be interpreted to indicate that the process shown in FIG. 11 will have the lowest operating costs (low D/F ratio), and the processes shown in FIGS. 8 and 9 will have the lowest capital costs (high productivity). Thus, these processes have considerable commercial promise.

TABLE 9

Comparison of total feed (prior art) with partial feed, Aspen Chromatography Version 10.1 Simulation Summary for 4-zone SMB with One Column per Zone

| Feed span | | total feed | | | partial feed | | |
|---|---|---|---|---|---|---|---|
| from (*tsw) | | 0.00 | 0.20 | 0.40 | 0.10 | 0.30 | 0.50 |
| to (*tsw) | | 1.00 | 0.80 | 0.60 | 0.50 | 0.70 | 0.90 |
| Feed starts at tf1 (s) | | 0.00 | 123.71 | 247.42 | 61.85 | 185.56 | 309.27 |
| feed ends at tf2 (s) | | 618.55 | 494.84 | 371.13 | 309.27 | 432.98 | 556.69 |
| Qd (cm³/s) Desorbent Flow-rate | | 0.0266 | 0.0266 | 0.0266 | 0.0266 | 0.0266 | 0.0266 |
| Qe (cm³/s) Extract Flow-rate | | 0.0233 | 0.0233 | 0.0233 | 0.0233 | 0.0233 | 0.0233 |
| Qf (cm³/s) | 1 (0–tf1) | 0.0166 | 0.0000 | 0.0000 | 0.0000 | 0.0000 | 0.0000 |
| Feed | 2 (tf1–tf2) | 0.0166 | 0.0277 | 0.0830 | 0.0415 | 0.0415 | 0.0415 |
| Flow-rate | 3 tf2–tsw) | 0.0166 | 0.0000 | 0.0000 | 0.0000 | 0.0000 | 0.0000 |
| Qr (cm³/s) | 1 (0–tf1) | 0.0864 | 0.0698 | 0.0698 | 0.0698 | 0.0698 | 0.0698 |
| Raffinate | 2 (tf1–tf2) | 0.0864 | 0.0975 | 0.1528 | 0.1113 | 0.1113 | 0.1113 |
| Flow-rate | 3 (tf2–tsw) | 0.0864 | 0.0698 | 0.0698 | 0.0698 | 0.0698 | 0.0698 |
| Raffinate prod. | dextran T6 | 37.39 | 38.51 | 39.17 | 38.79 | 38.89 | 38.24 |
| concentrations (g/l) | raffinose | 5.16 | 4.11 | 3.74 | 4.12 | 3.84 | 3.70 |
| Extract prod. | dextran T6 | 3.71 | 2.74 | 2.17 | 2.50 | 2.41 | 2.97 |
| concentrations (g/l) | raffinose | 31.18 | 32.05 | 32.36 | 32.05 | 32.28 | 32.40 |
| recovery | dextran T6 | 72.27% | 78.45% | 82.34% | 80.08% | 80.66% | 76.93% |
|  | raffinose | 66.87% | 72.27% | 74.27% | 72.19% | 73.73% | 74.51% |
| Purity | dextran T6 | 87.88% | 90.37% | 91.28% | 90.40% | 91.01% | 91.18% |
|  | raffinose | 89.36% | 92.13% | 93.70% | 92.77% | 93.04% | 91.61% |

Productivity = $5.68 * 10^{-5}$ g/(s cm³); $Q_{recycle}$ = 0.0665 cm³/s; tsw = 618.55 s

TABLE 10

Comparison of total feed (prior art) with partial feed Lapidus and Amundson dispersion model Simulation Summary for 3-Zone SMB with One Column per Zone

| Feed span | | total feed | | partial feed | | |
|---|---|---|---|---|---|---|
| (from–to; *tsw) | | 0–1 | 0.2–0.8 | ⅓–⅔ | 0–⅓ | ⅔–1 |
| feed starts at tf1 (s) | | 0 | 124.428 | 207.38 | 0 | 414.76 |
| feed ends at tf2 (s) | | 622.14 | 497.712 | 414.76 | 207.38 | 622.14 |
| Qd (cm³s) Desorbent flow rate | | 0.0931 | 0.0931 | 0.0931 | 0.0931 | 0.0931 |
| New desorbent added (cm³s) | | 0.0773 | 0.0412 | 0.0414 | 0.0582 | 0.0427 |
| Qe (cm³s) Extract Flow-rate | | 0.0233 | 0.0233 | 0.0233 | 0.0233 | 0.0233 |
| Qf (cm³s) | 1 (0–tf1) | 0.0166 | 0 | 0 | 0.0498 | 0 |
| Feed | 2 (tf1–tf2) | 0.0166 | 0.0277 | 0.0498 | 0 | 0 |
| Flow-rate | 3 (tf2–tsw) | 0.0166 | 0 | 0 | 0 | 0.0498 |
| Qr (cm³s) | 1 (0–tf1) | 0.0864 | 0.0698 | 0.0698 | 0.1196 | 0.0698 |
| Raffinate | 2 (tf1–tf2) | 0.0864 | 0.0975 | 0.1196 | 0.0698 | 0.0698 |
| Flow-rate | 3 (tf2–tsw) | 0.0864 | 0.0698 | 0.0698 | 0.0698 | 0.1196 |
| Qoutr (g/tsw) | dextran T6 | 0.5116 | 0.5308 | 0.5233 | 0.5096 | 0.514 |
| Raffinate prods. | raffinose | 0.0405 | 0.0095 | 0.0014 | 0.044 | 0.0014 |
| Qoute (g/tsw) | dextran T6 | 0.0065 | 8.31E-04 | 2.83E-04 | 3.93E-04 | 0.0087 |
| Extract prods. | raffinose | 0.4672 | 0.4846 | 0.4895 | 0.4507 | 0.4895 |
| recovery | dextran T6 | 98.75% | 99.84% | 99.95% | 100.00% | 98.34% |
|  | raffinose | 92.02% | 98.08% | 99.71% | 91.11% | 99.71% |
| Purity | dextran T6 | 92.66% | 98.24% | 99.73% | 92.05% | 99.73% |
|  | raffinose | 98.63% | 99.83% | 99.94% | 100.00% | 98.25% |

Productivity = $7.57 * 10{-5}$ g/(s cm³)
tsw-622.14 s

TABLE 11

System and Operating Parameters

System parameters (Dunnebier et al.(1998) & Ching et al. (1992))

| | |
|---|---|
| d | 1.4 cm |
| L | 47.5 cm |
| $\epsilon$ | 0.45 |
| $R_P$ | 0.0011 cm |
| $K_R$ | 0.56 |
| $K_{T6}$ | 0.23 |
| $\rho$ | 1.0 g/cm³ |
| $k_{eff}$, R | $2.09 * 10^{-5}$ cm/s |
| $k_{eff}$, T6 | $1.72 * 10^{-5}$ cm/s |

TABLE 11-continued

System and Operating Parameters

Operating parameters (Dunnebier et al., Chem. Eng. Sci., 53: 2537–46 (1998))

| | |
|---|---|
| Concentration of Feed $c_{F,1}$, i = T6, R | 0.05 g/c |
| Feed Flow-rate $Q_F$ | 0.0166 cm³/s |
| Extract Flow-rate $Q_E$ | 0.0233 cm³/s |
| Desorbent Flow-rate $Q_D$ | 0.0266 cm³/s |
| Recycle Flow-rate | 0.0665 cm³/s |
| Switching period tsw | 618.55 s for the 4-zone SMB |
| | 622.14 s for the 3-zone SMB |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A system for performing a separation of a feed stream that comprises at least three components, the system comprising a first simulated moving bed separation apparatus and a second simulated moving bed separation apparatus, the first simulated moving bed separation apparatus adapted to discharge at least two streams, the at least two streams comprising a first discharge stream comprising all the components except that it does not comprise substantial amounts of a least retained component, and a second discharge stream comprising all the components except that it does not comprise substantial amounts of a most retained component, thus effecting a substantial separation of the least retained component from the most retained component, wherein at least one of the first or second discharge streams becomes a feed stream for the second simulated moving bed separation apparatus.

2. The system of claim 1 wherein the at least two streams comprise a third discharge stream that comprises the least retained component and no substantial amounts of any other component and a fourth discharge stream that comprises the most retained component and no substantial amounts of any other component.

3. The system of claim 2 wherein the first and second simulated moving bed separation apparatuses are configured into a loop.

4. The system of claim 1 wherein the first discharge stream becomes a feed stream for the second simulated moving bed separation apparatus and the second discharge stream becomes a feed stream for a third simulated moving bed separation apparatus.

5. The system of claim 1 wherein the first discharge stream becomes a first feed stream for the second simulated moving bed separation apparatus and the second discharge stream becomes a second feed stream for the second simulated moving bed separation apparatus.

6. The system of claim 5 wherein the at least two streams from the first simulated moving bed apparatus comprise a third discharge stream that comprises the least retained component and no substantial amounts of any other component and a fourth discharge stream that comprises the most retained component and no substantial amounts of any other component.

7. The system of claim 5 wherein the second simulated moving bed separation apparatus comprises a first discharge stream comprising all the components except that it does not comprise substantial amounts of a least retained component, the second simulated moving bed separation apparatus further comprising a second discharge stream comprising all the components except that it does not comprise substantial amounts of a most retained component, and wherein the second simulated moving bed separation apparatus further comprises a third discharge stream taken from between the first and second feed streams of the second simulated moving bed separation apparatus.

8. The system of claim 7 wherein the third discharge stream from the second simulated moving bed separation apparatus comprises all the components except that it does not comprise substantial amounts of either the least retained component or the most retained component.

9. The system of claim 1 wherein the first and second simulated moving bed separation apparatuses are configured into a loop.

* * * * *

UNITED STATES PATENT AND TRADEMARK OFFICE
CERTIFICATE OF CORRECTION

PATENT NO. : 6,740,243 B2
DATED : May 25, 2004
INVENTOR(S) : Phillip C. Wankat

It is certified that error appears in the above-identified patent and that said Letters Patent is hereby corrected as shown below:

<u>Title page,</u>
Item [56], References Cited, insert -- FOREIGN PATENT DOCUMENTS
EP 0 663 224 A1 07/1995 --
OTHER PUBLICATIONS before "Nicoud", insert -- Nicolaos et al. "Application of equilibrium theory to ternary moving bed configuration (four+four, five+four, eight and nine zones) I. Linear case" *Journal of Chromatography* A 2001;*908*:71-86. --

Signed and Sealed this

Ninth Day of August, 2005

JON W. DUDAS
*Director of the United States Patent and Trademark Office*